(12) United States Patent
Lindell et al.

(10) Patent No.: US 12,688,498 B2
(45) Date of Patent: Jul. 21, 2026

(54) MULTI-PARTY COMPUTATION SELF-CUSTODY WALLET

(71) Applicant: Coinbase, Inc., Oakland, CA (US)

(72) Inventors: Yehuda Lindell, Oakland, CA (US); Nir Steinherz, Oakland, CA (US); Guy Pe'er, Talmey Yechiel (IL)

(*) Notice: Subject to any disclaimer, the term of this patent is extended or adjusted under 35 U.S.C. 154(b) by 154 days.

(21) Appl. No.: 18/172,899

(22) Filed: Feb. 22, 2023

(65) Prior Publication Data

US 2024/0281795 A1 Aug. 22, 2024

(51) Int. Cl.
| | |
|---|---|
| *G06Q 20/36* | (2012.01) |
| *G06Q 20/38* | (2012.01) |
| *H04L 9/32* | (2006.01) |

(52) U.S. Cl.
CPC ....... *G06Q 20/3674* (2013.01); *G06Q 20/389* (2013.01); *H04L 9/3247* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 9,673,975 B1 * | 6/2017 | Machani | .............. | H04L 9/0822 |
| 2021/0144002 A1 * | 5/2021 | Aronesty | ................. | H04L 9/14 |

| | | | | |
|---|---|---|---|---|
| 2021/0167947 A1 * | 6/2021 | Chung | .................. | H04L 9/3268 |
| 2022/0045867 A1 | 2/2022 | Beery et al. | | |
| 2022/0366491 A1 * | 11/2022 | Hill | ..................... | G06Q 20/3825 |
| 2023/0068597 A1 | 3/2023 | Chen | | |
| 2023/0299942 A1 | 9/2023 | Be'Ery et al. | | |
| 2023/0325815 A1 * | 10/2023 | Parker | ............... | G06Q 20/3821 |
| | | | | 705/67 |
| 2023/0396456 A1 * | 12/2023 | Anderson | ............. | H04L 9/3255 |
| 2024/0015152 A1 * | 1/2024 | Herder, III | ............ | H04L 9/3242 |
| 2024/0089091 A1 * | 3/2024 | Ferguson | .............. | H04L 9/0838 |
| 2024/0281798 A1 | 8/2024 | Lindell et al. | | |

* cited by examiner

*Primary Examiner* — Chrystina E Zelaskiewicz
(74) *Attorney, Agent, or Firm* — Holland & Hart LLP

(57) ABSTRACT

Methods, systems, and devices for token management are described. A custodial token platform may communicate with a wallet application to support a multi-party computation wallet and transfer of private keys and key shards to support wallet cloning and key export. The custodial token platform may receive a message signed by a first key shard, sign the message using a second key shard, and broadcast the signed message to transfer a token between the wallet application and a recipient address. The custodial token platform may receive an encrypted payload including the first key shard, and transmit the encrypted payload to a second client application for decryption by the second client application on a second user device. Additionally, the wallet application may support export of the private key based one or multiple authentication techniques, which may cause retrieval of the key shards and display of an indication of the private key.

14 Claims, 17 Drawing Sheets

Message Request Interface

1025

Message Communication Interface

1035

User Authentication Component

1045

Payload Encryption Component

1055

Camera Component

1065

Key Generation Component

1075

Message Signing Component

1030

Key Management Component

1040

Key Shard Communication Component

1050

UI Component

1060

Key Identification Component

1070

1020

1000

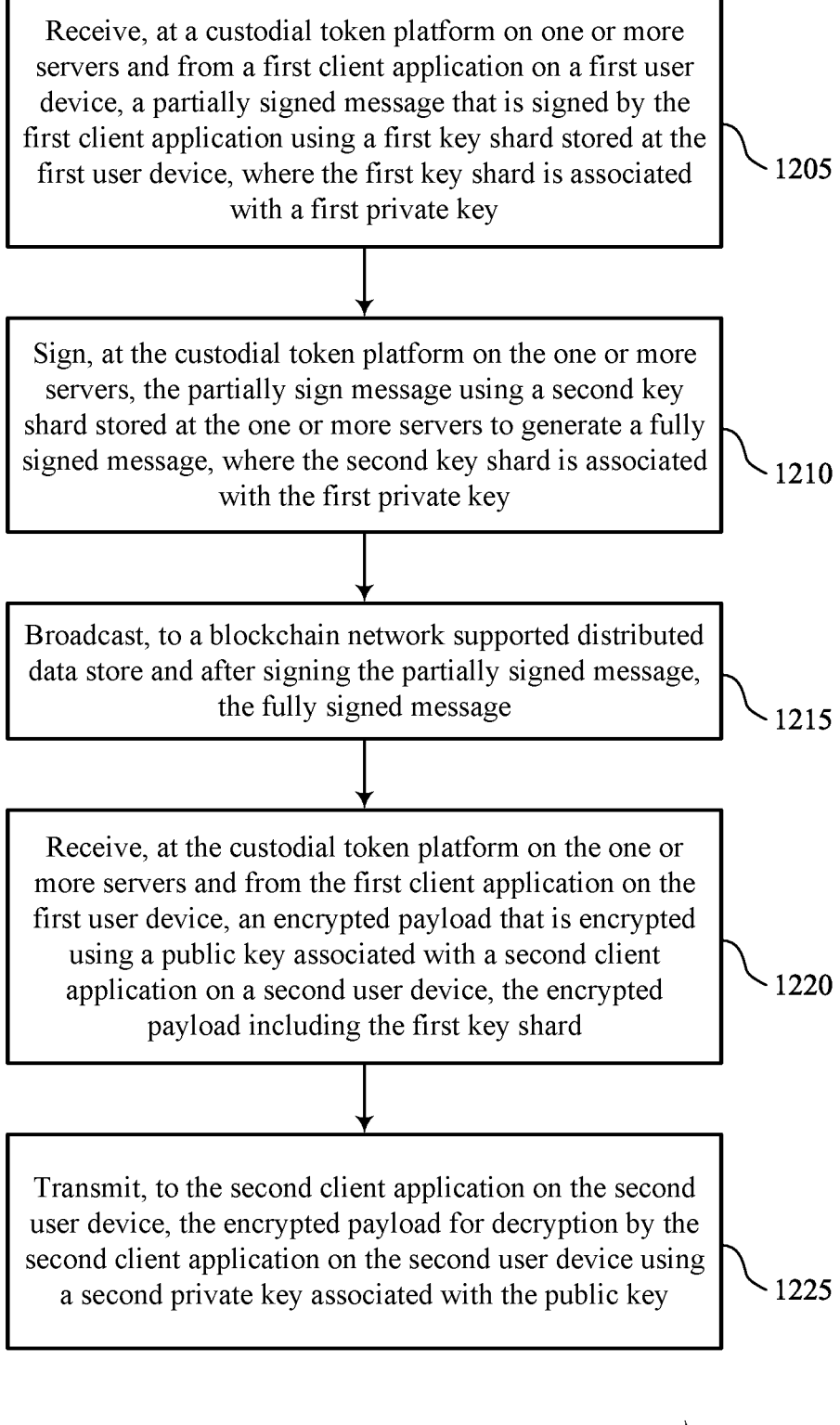

Receive, at a custodial token platform on one or more servers and from a first client application on a first user device, a partially signed message that is signed by the first client application using a first key shard stored at the first user device, where the first key shard is associated with a first private key ⟩ 1205

Sign, at the custodial token platform on the one or more servers, the partially sign message using a second key shard stored at the one or more servers to generate a fully signed message, where the second key shard is associated with the first private key ⟩ 1210

Broadcast, to a blockchain network supported distributed data store and after signing the partially signed message, the fully signed message ⟩ 1215

Receive, at the custodial token platform on the one or more servers and from the first client application on the first user device, an encrypted payload that is encrypted using a public key associated with a second client application on a second user device, the encrypted payload including the first key shard ⟩ 1220

Transmit, to the second client application on the second user device, the encrypted payload for decryption by the second client application on the second user device using a second private key associated with the public key ⟩ 1225

Figure 13:
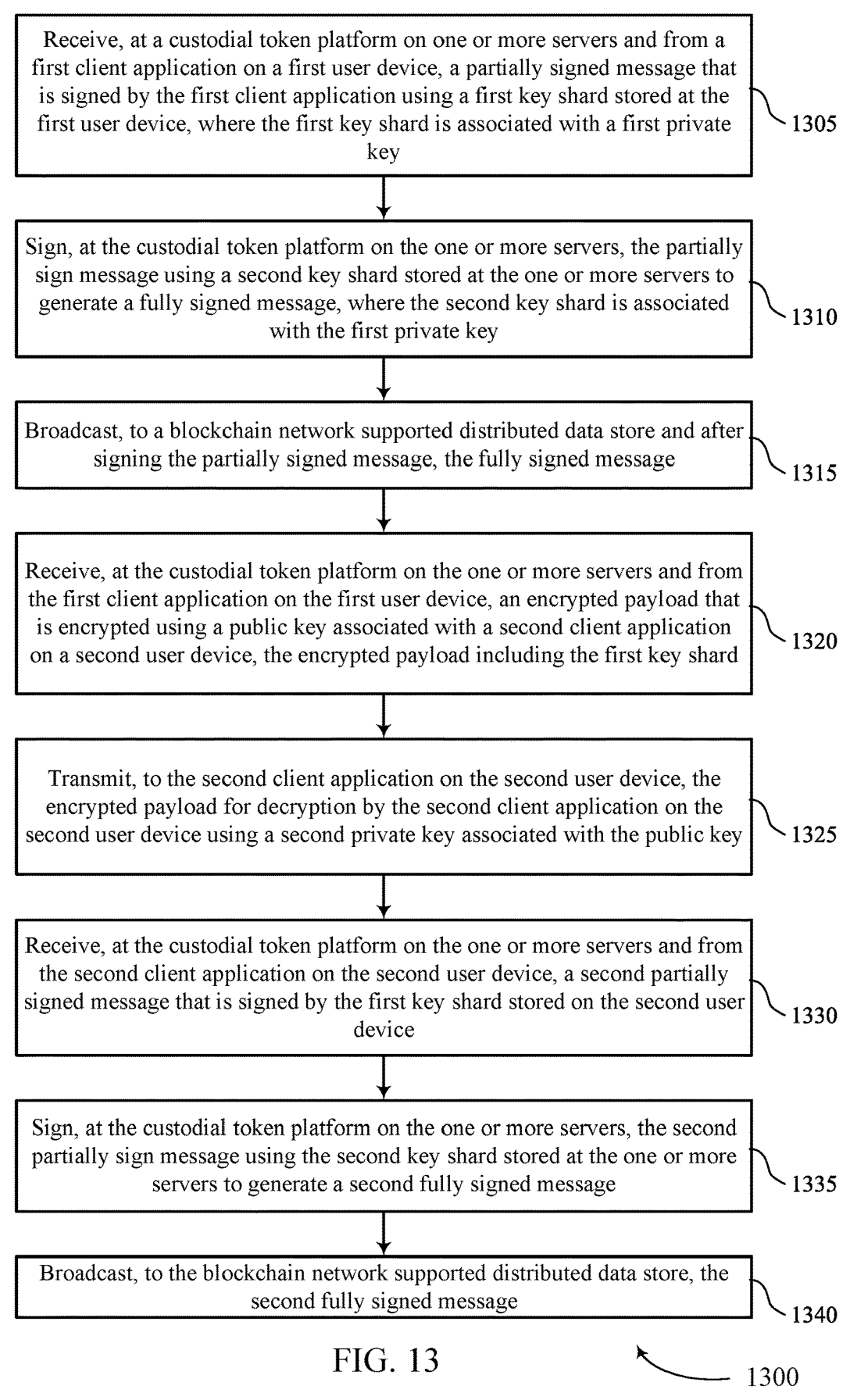

Receive, at a custodial token platform on one or more servers and from a first client application on a first user device, a partially signed message that is signed by the first client application using a first key shard stored at the first user device, where the first key shard is associated with a first private key ⟍ 1305

Sign, at the custodial token platform on the one or more servers, the partially sign message using a second key shard stored at the one or more servers to generate a fully signed message, where the second key shard is associated with the first private key ⟍ 1310

Broadcast, to a blockchain network supported distributed data store and after signing the partially signed message, the fully signed message ⟍ 1315

Receive, at the custodial token platform on the one or more servers and from the first client application on the first user device, an encrypted payload that is encrypted using a public key associated with a second client application on a second user device, the encrypted payload including the first key shard ⟍ 1320

Transmit, to the second client application on the second user device, the encrypted payload for decryption by the second client application on the second user device using a second private key associated with the public key ⟍ 1325

Receive, at the custodial token platform on the one or more servers and from the second client application on the second user device, a second partially signed message that is signed by the first key shard stored on the second user device ⟍ 1330

Sign, at the custodial token platform on the one or more servers, the second partially sign message using the second key shard stored at the one or more servers to generate a second fully signed message ⟍ 1335

Broadcast, to the blockchain network supported distributed data store, the second fully signed message ⟍ 1340

FIG. 13          ⟍ 1300

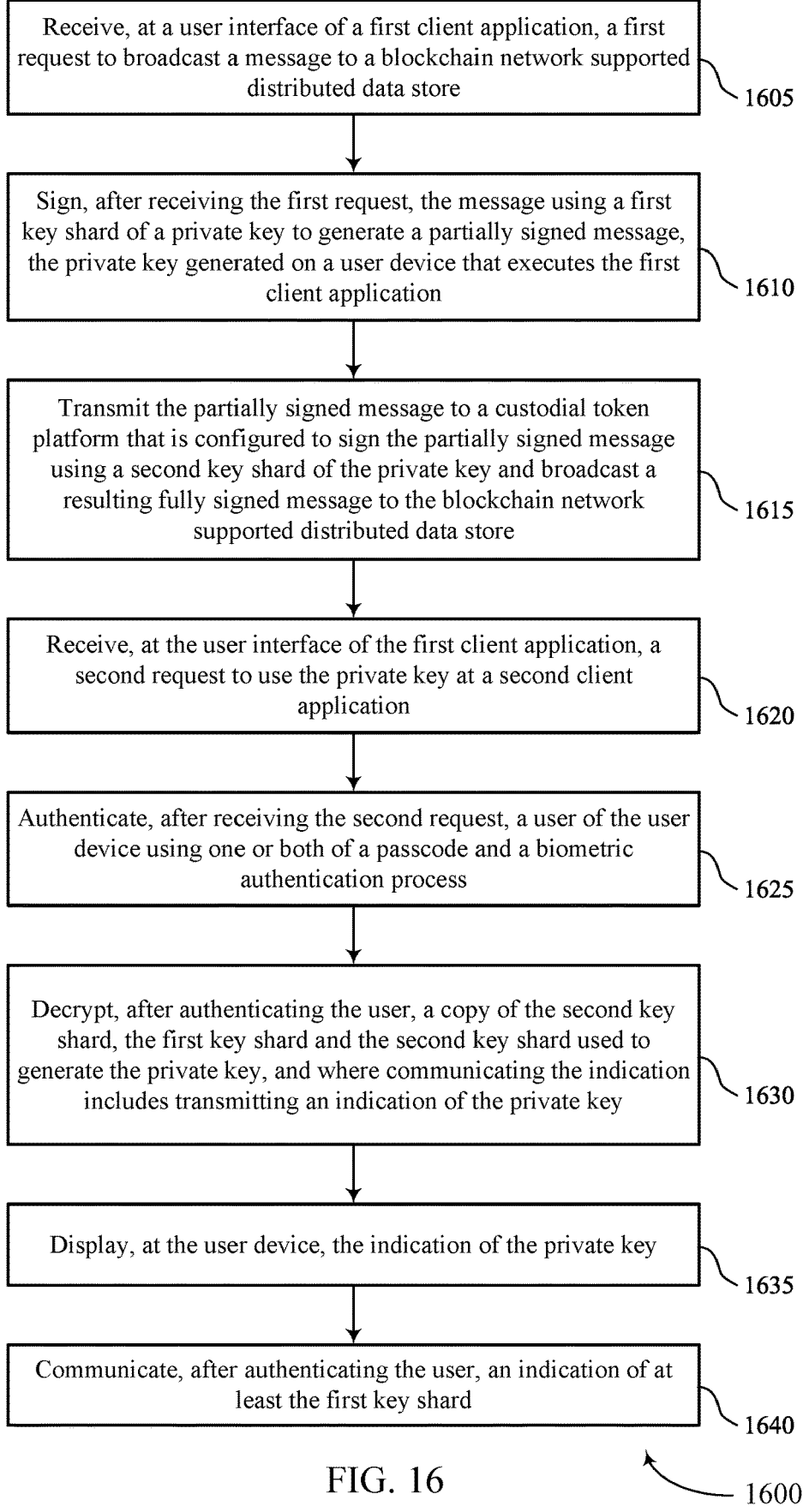

Receive, at a user interface of a first client application, a first request to broadcast a message to a blockchain network supported distributed data store
1605

Sign, after receiving the first request, the message using a first key shard of a private key to generate a partially signed message, the private key generated on a user device that executes the first client application
1610

Transmit the partially signed message to a custodial token platform that is configured to sign the partially signed message using a second key shard of the private key and broadcast a resulting fully signed message to the blockchain network supported distributed data store
1615

Receive, at the user interface of the first client application, a second request to use the private key at a second client application
1620

Authenticate, after receiving the second request, a user of the user device using one or both of a passcode and a biometric authentication process
1625

Decrypt, after authenticating the user, a copy of the second key shard, the first key shard and the second key shard used to generate the private key, and where communicating the indication includes transmitting an indication of the private key
1630

Display, at the user device, the indication of the private key
1635

Communicate, after authenticating the user, an indication of at least the first key shard
1640

MULTI-PARTY COMPUTATION SELF-CUSTODY WALLET

FIELD OF TECHNOLOGY

The present disclosure relates generally to data management, including techniques for multi-party computation self-custody wallet.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 12 through 17 illustrate flowcharts showing methods that support multi-party computation self-custody wallet in accordance with aspects of the present disclosure.

DETAILED DESCRIPTION

Figure 1:
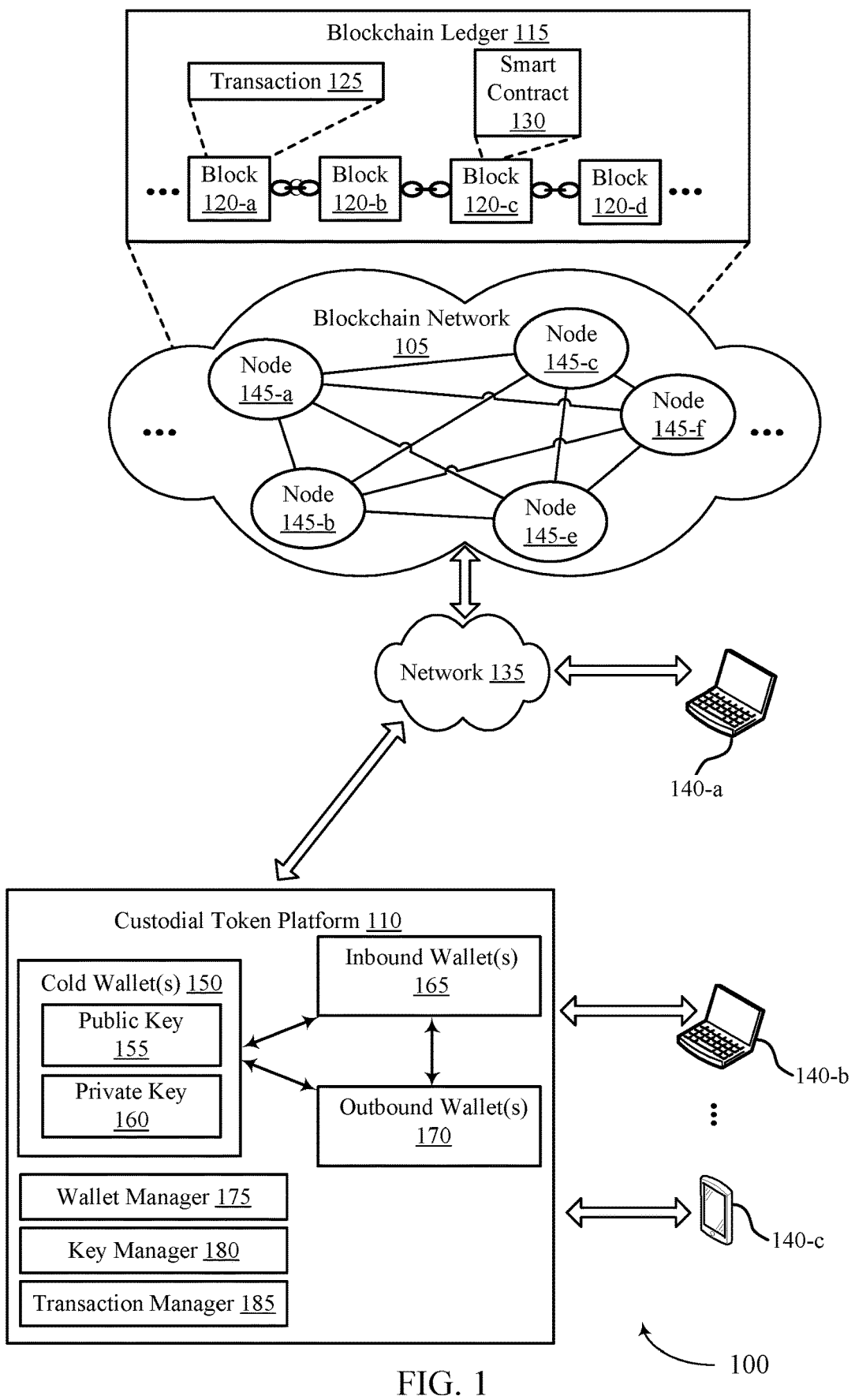
FIG. 1 illustrates an example of a computing environment that supports a multi-party computation self-custody wallet in accordance with aspects of the present disclosure.

A wallet application may be used to store digital assets, such as crypto tokens, that are supported by blockchain networks. In some cases, the wallet, in conjunction with digital assets, may be used to access web services. The technique of using blockchain supported assets and wallet applications for accessing services on the web may be referred to as "Web3." A wallet application, which may be referred to as a digital asset wallet, may utilize public key cryptography and therefore may be associated with one or more public keys that are used to receive digital assets and one or more private keys that are used to sign transactions or messages. In some examples, a wallet may be custodial or non-custodial. In a custodial wallet application, a user may trust a third party, such as a custodial token platform, to manage private keys associated with a wallet address (public key). With a non-custodial wallet (also referred to as a self-custody wallet), the user has full access to the private keys associated with the public key.

However, if a user has a non-custodial wallet (e.g., a self-custody wallet), and loses access to the wallet application, wallet device, private keys, and/or a seed phrase (e.g., mnemonic), then the user may lose access to the assets associated with the wallet. As such, many users may use a custodial wallet. However, as noted, these wallets may require the user to trust that the third-party wallet platform not lose the keys or utilize the tokens associated with the wallet.

Techniques described herein support a multi-party computation (MPC) wallet that allows a user to leverage a third-party platform to sign transactions, while also supporting the ability of the user having access to a full private key in case the user wants to export the private key to another wallet application. For example, a custodial token platform may receive an indication of a key shard associated with a private key (e.g., a portion of the private key) from a client application or another key service. The custodial token platform may subsequently receive messages from the client application, and the messages may be partially signed using one or more other portions of the private key. The custodial token platform may sign the message using the key shard and broadcast the message to the blockchain network. The message may be configured to transfer a crypto token from the user wallet to another wallet address. As such, both key shards are used to sign the message in different locations (e.g., the client application and the custodial token platform).

In some examples, a user may wish to use the functionality of the wallet in another client application. For example, the user may access a wallet application on a mobile device (e.g., a phone) and access a corresponding application on a browser of a computer. In such cases, the user may want to use the same wallet address at both wallet applications. Techniques described herein support the transfer of an encrypted payload to the second client application (e.g., the browser) using secure communication techniques with the custodial token platform, thus allowing the second application to sign messages using the first key shard and the custodial token platform to sign the message using a second key shard and broadcast the message via the blockchain network. Techniques described herein also support a user exporting a full version of the private key to another wallet application or device. The private key may be exported without having to retrieve the key shard from the custodial token platform. As such, the techniques described herein support a self-custody wallet that may not require the user to maintain or store a secure mnemonic for restoration or recovery of the private key, which results in improved user experience and limits or prevents the loss of digital assets. These and other techniques are described in further detail with respect to the figures.

FIG. 1 illustrates an example of a computing environment 100 that supports a multi-party computation self-custody wallet in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145-*c* may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-*a* may provide user inputs via the computing device 145-*a*, which may result in commands, data, or any combination thereof being communicated via the network 135 to the computing system custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180) may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital asset between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to case transfer of tokens from a wallet managed by the custodial token platform 110 to an external wallet, to deploy a smart contract (e.g., a self-executing program), or to call a smart contract.

As described herein users may interact with the blockchain network 105 using the custodial token platform 110 via non-custodial wallets (e.g., at computing device 140), or via another platform or service. The inbound wallets 165 of the custodial token platform 110 may be referred to as custodial wallets, as the custodial token platform 110 may manage the private keys (e.g., private key 160) associated with the inbound wallets 165. In some cases, the non-custodial inbound wallets 165 may be used to interact with services of the custodial token platform 110, such as trading and exchanging. However, some users may want access to services supported by the custodial token platform 110 while maintain or owning the private keys for the wallet.

Techniques described herein support a MPC wallet that allows a user to access services provided by the custodial token platform 110 while also being able to access the private key of the wallet in a secure manner. For example, if the user wants to use the wallet address for another type of wallet, then the user is allowed to export the private key using the techniques described herein. Additionally, the user may access the services of the custodial token platform 110 using multiple different types of wallet applications, such as a wallet application installed on a mobile device and a wallet application installed on a browser of a personal computer. To support access via these different devices, the techniques described herein supporting "cloning" of a key shard (portion of a private key) from one device to another using secure communication techniques with the custodial token platform.

Figure 2:
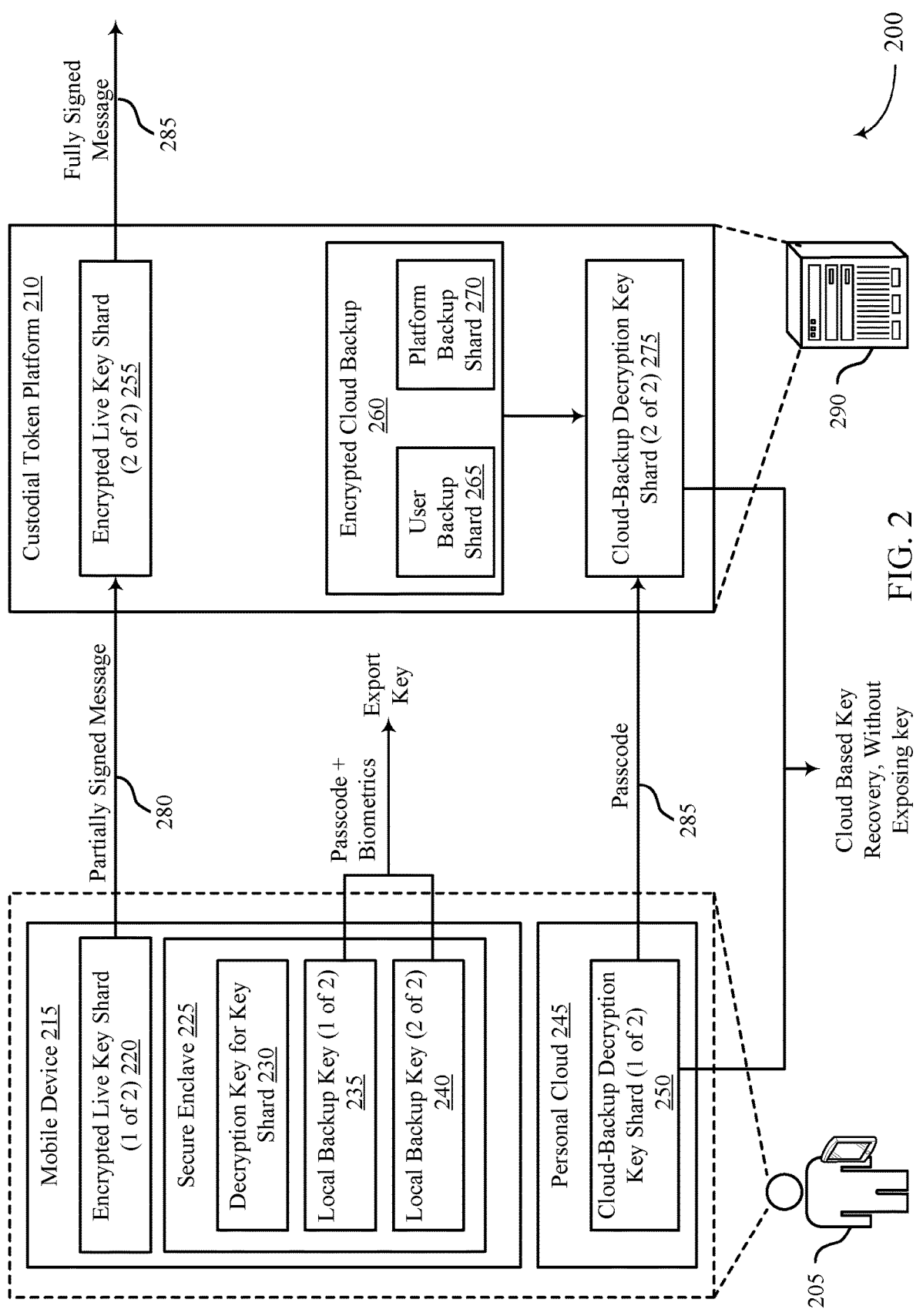
FIG. 2 illustrates an example of a computing environment that supports a multi-party computation self-custody wallet in accordance with aspects of the present disclosure.

FIG. 2 illustrates an example of a computing environment 200 that supports a multi-party computation self-custody wallet in accordance with aspects of the present disclosure. The computing environment 200 includes a user 205 and a custodial token platform 210. The custodial token platform 210 may be an example of the custodial token platform 110 as described with respect to FIG. 1 and may be supported by one or more servers, such as server 290. The user may access services provided by the custodial token platform 210 via a mobile device 215. For example, the mobile device 215 may execute an application associated with the custodial token platform 210 or may access the custodial token platform 210 via a web browser.

As described herein, the mobile device 215 may use a MPC wallet application to interact with and access services of the custodial token platform 210. The MPC wallet application may utilize a secure enclave 225 (e.g., a Trusted Execution Environment (TEE)) to generate and use cryptographic keys. In some examples, the wallet application may access a development kit to generate keys and key shards. Additionally, or alternatively, the mobile device 215 may receive cryptographic keys from another service or device.

As described herein, the wallet application of the mobile device 215 may be associated with a public key and a private key. To support the MPC techniques described herein, the private key may be divided into one or multiple key shards including encrypted live key shard 220 and encrypted live key shard 255. After dividing the private key into multiple key shards, the mobile device 215 may communicate portions of the key shards to target devices or system. For example, the mobile device 215 may communicate the key shard 255 to the custodial token platform 210. In some examples, the key shard 255 is communicated in a secure manner, such as by encrypting and transmitting the key shard 255. That is, the mobile device 215 may encrypt the key shard 255 using a public key associated with the custodial token platform 210, and the custodial token platform 210 may decrypt the encrypted key shard 255 using a corresponding private key. In some examples, the custodial token platform 210 may store the key shard 255 in a key store in association with an account corresponding to the user 205 and/or in association with a public key for the wallet application on the mobile device.

In one example use of the MPC techniques described herein, a user may wish to transfer a crypto token from the wallet address associated with the wallet application on the mobile device 215 to another address via a blockchain network (e.g., blockchain network 105 of FIG. 1). Using a user interface wallet application on the user device, the user may enter the recipient address, the token type, amount, gas fees, etc., and after acceptance of a generated message, the mobile device 215 may retrieve a decryption key 230 from the secure enclave 225, decrypt the key shard 220, sign the message using the decrypted shard, and transmit the message to the custodial token platform 210 (e.g., one or more servers supporting the custodial token platform 210) via signed message 280. Signing the message at the mobile device using the key shard 220 results in a partially signed message. The message is partially signed, because another party may not be able to verify that the message is validly signed using the corresponding public key.

After receiving the partially signed message 280, the custodial token platform 210 may sign the partially signed message using the key shard 255 to generate a fully signed message. The fully signed message may then be broadcast, by the custodial token platform 210, to the blockchain network (e.g., blockchain network 105 of FIG. 1). The message may be a transaction that is configured to transfer the crypto token from the public key (e.g., wallet address) associated with the user 205 (e.g., via the wallet application on the user device) to another address, such as an address associated with a different wallet or a smart contract address.

As such, using these techniques, the custodial token platform 210 may be limited from having full access to the private key for the user 205. As such, the user 205 may not have to completely trust the custodial token platform 210. Further, as described in further detail herein, the user may export the private key and/or clone the private key to another application or device. Accordingly, using the MPC techniques described herein, the wallet application functions as a self-custody wallet, while maintaining access to the custodial token platform 210.

The mobile device 215 may also maintain backups of the private key/key shards. For example, a local backup key of the key shard 220 and a local backup key 240 of the key shard 255 may be stored in the secure enclave 225. These local backup keys 235 and 240 may be accessible only via a passcode and biometric authentication (or another type of authentication technique). Because the local backup key 235 and 240 may be used to generate the full private key, the local backup keys 235 and 240 are stored in the secure enclave 225 and are accessible using enhanced security measures. In some examples, instead of the local backup keys 235 and 240 being stored, the entire private key is stored, or a mnemonic representing the private key or shards is stored.

As described, the MPC wallet functionality described herein supports export of the private keys or corresponding key shards. Export of the private key may be performed without using aspects of the custodial token platform 210 or without communicating with the custodial token platform 210. Thus, the user 205 may access the wallet application of the mobile device 215 (or another computing device with the wallet application) and request to perform an export of the private key. After receiving the indication, the wallet application on the mobile device 215 may prompt for a passcode, biometrics information, or both. A passcode may include an alphanumeric password, a numerical passcode, etc. The biometric information may include a face scan, a fingerprint, or the like. The passcode or biometric prompts may leverage authentication techniques supported by the operating system of the mobile device 215.

After authentication using a passcode, biometrics, or both (in addition to other authentication techniques), the mobile device 215 may retrieve the private key from the secure enclave 225. For example, the mobile device 215 may retrieve the local backup key 235 and the local backup key 240 from the secure enclave 225. In some examples, the mobile device 215 may display the private key and/or the backup key shards (e.g., the local backup key 235 and the local backup key 240) or otherwise indicate the private key to the user. For example, the mobile device 215 displays the alphanumeric versions of the key shards, the entire private key, or a corresponding seed phrase (mnemonic). In the case of the seed phrase, the mobile device 215 may derive the seed phrase using the private key. The user may then use the private key to instantiate another wallet application or wallet device, such as self-custody wallet (hardware and/or software wallet). Thereafter, the user may access and/or transmit crypto tokens that are attributed to the public key associated with the private key using the instantiated wallet.

Additionally, the MPC wallet techniques described herein may support cloning the private key (or private key shards) to another wallet application on the mobile device 215 or a different user device, such as a wallet application installed on a browser of a laptop or desktop computer. To clone the private key, at least the key shard 220 is to be transmitted to the second wallet application using secure communication techniques. In such cases, after transfer, the user 205 may use the second wallet application to partially sign messages, transmit the partially signed message to the custodial token platform 210. The custodial token platform 210 may sign the partially signed message using the key shard 255 and the broadcast a resulting fully signed message to the blockchain network, as described herein.

To clone the key shard, the user may access the user interface of the wallet application of the mobile device 215 and indicate a desire to clone the key (e.g., by activating a button on the user interface). After requesting to clone the key, the device may prompt for authentication, such as by requesting a username, a password, a passcode, and/or requesting biometric authentication. The user interface may then prompt for the user to scan a quick response (QR) code (or another type of address identifier) corresponding to an address of the target device or to enter the address of the target device. As such, the user may activate the QR code on the target device (e.g., using the target device wallet application) such that the source device can scan the QR code in the camera. The source device may identify an address/public key of the source client application (e.g., source wallet), encrypt a payload for the public key, and transmit the payload to the custodial token platform 210. The payload may include at least the key shard 220 (or the local backup key 235). Because the payload is encrypted, the custodial token platform 210 cannot access the key shard 220 to recreate the entire private key using the encrypted live key shard 255. Thus, after creation of the private key, the key shards are not accessible to recreate the entire private key by a party other than the user devices. The custodial token platform may then transmit the encrypted payload to the target device/application for decryption. The target device may then use the key shard for transactions and/or messages as described herein. Additional aspects related to cloning are described in further detail with respect to FIG. 3.

Personal cloud 245 and encrypted cloud backup 260 may be used in cases where the user 205 loses a device. Thus, a user may backup the key shard 220 to a personal backup location, such as the personal cloud 245, as key shard 250. The user may get a new device, and install the wallet application, and retrieve the key shard 250 from the personal cloud 245. The user may then authenticate (e.g., by entering passcode 285) and the custodial token platform may decrypt the encrypted cloud backup 260 that includes a user backup shard 265 (which may correspond to the key shard 220) and the backup shard 270 (which may correspond to the key shard 255) to generate key shard 275. Thus, the user wallet application may be restored.

Figure 3:
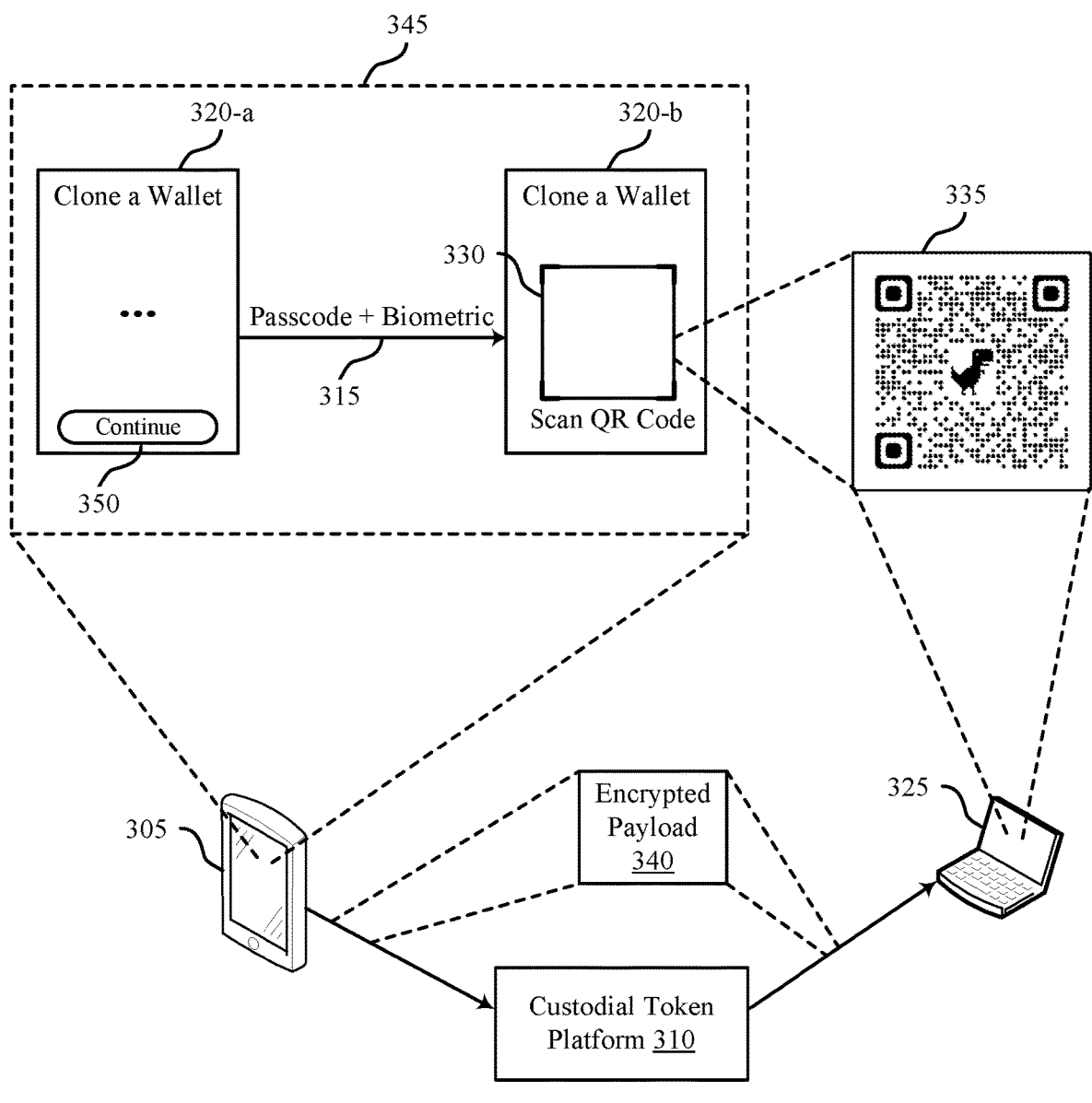
FIG. 3 illustrates an example of a diagram of a cloning procedure that supports a multi-party computation self-custody wallet in accordance with aspects of the present disclosure.

FIG. 3 illustrates an example of a diagram 300 of a cloning procedure that supports a multi-party computation self-custody wallet in accordance with aspects of the present disclosure. The diagram 300 of the cloning procedure includes a source device 305 (e.g., a first user device) and a target device 325 (e.g., a second user device), and a custodial token platform 310. The custodial token platform 310 may be an example of the custodial token platform 110 and 210 as described with respect to FIGS. 1 and 2. The custodial token platform 310 may be supported by one or more servers.

As described herein, the source device 305 may execute a client application 345 (e.g., a wallet application) that is used to interact with the custodial token platform 310. For example, as described with respect to FIG. 2, the client application 345 may interact with aspects of the source device 305 to generate and store a private key and shard the private key into one or more key shards. The client application 345 may communicate the second private key shard to the custodial token platform 310, and then communication partially signed messages to the custodial token platform 310, such that the custodial token platform 310 may sign the message using the key shard and broadcast the message to the blockchain network.

In some examples, the user may wish to utilize similar features using another device, such as target device 325. As such, the user may install a corresponding client application (e.g., a second client application) on the source device. The client application may be configured to interact with the custodial token platform 310 as described herein. However, the user may wish to use the private key that is associated with the client application 345 in the client application installed on the target device 325, and as such, transfer the private key shard from the source device 305 to the target device 325. After transfer of the private key, the user is able to use the same wallet (e.g., private key and public key address/wallet address) on two different devices. The process of transfer of a private key shard to another wallet application is referred to herein as "cloning."

To clone the private key shard, the user may access a user interface 320-a of the client application 345 and activate a cloning service or process. After activating the cloning process (e.g., using a button 350) on the user interface 320-a). The client application 345 may prompt for authentication, such as by prompting for a passcode and/or biometric authentication 315. In some examples, the user interface 320 transitions to a page that displays components for entering passcode and/or for biometric authentication. These authentication techniques may leverage operating system facilities of the source device 305, as described herein.

After authentication, the user interface 320-b of the client application 345 may prompt for the user to enter or identify the wallet address of the client application on the target device 325. In some examples, and as illustrated in FIG. 3, the user interface displays a field 330 for capturing or scanning a QR code 335 corresponding to a public key of the wallet of the target device 325. As such, the user may access the client application on the source device and activate (e.g., cause to display) the QR code 335 corresponding to the wallet address. For example, the user may access the client application and select an option to clone the wallet from another device such as to display the QR code. The user may then direct the camera to the displayed QR code 335 such that the client application 345 may scan the QR code to identify the wallet address/public key. As such, the source device 305 is used to scan the public key displayed at the target device 325. It should be understood that other techniques for providing the wallet address of the target device 325 to the client application 345 of the source device 305 may be used. For example, the user may enter the alphanumeric of the public key using a keyboard or keypad. However, use of the QR code scanning technique described herein provides an improved user experience, as well as improved security (e.g., by limiting errors that may result from a user entering the key manually).

To transfer the private key (e.g., private key shard) to the target device 325, the source device may create an encrypted payload 340 and transfer the encrypted payload to the custodial token platform 310. The encrypted payload 340 may include the following data with the data type:

| | |
|---|---|
| SeedID | string |
| UserName | string |
| PartitionID | string |
| EncWalletBundle | [ ]byte //encrypted |
| IsMainBackupSeed | bool |
| IdentityPubKey | [ ]byte |
| TransportPubKey | [ ]byte |

The EncWalletBundle may include the encrypted key shard that is used by the client application 345 for partially signing messages. In some examples, the key shard (or EncWalletBundle) is encrypted using the public key/wallet address of the client application on the target device 325. The encrypted payload 340 is transmitted (e.g., via an application programming interface (API)) to the custodial token platform 310. After receiving the encrypted payload 340, the custodial token platform 310 may store the client bundle in association with the user (e.g., based on the UserName) in a data store.

The target device 325 may, after authentication, request the encrypted payload 340, and the custodial token platform 310 may transfer the encrypted payload 340 to the target device 325. In some examples, the custodial token platform 310 may duplicate the seed and derived keys and send the bundle to the target device 325. More particularly, the custodial token platform may copy the corresponding key shard for use with the target device 325. The duplicated seed and derived keys may be associated with new identifiers in the data store. The client application on the target device 325 may complete the clone procedure by decrypting the key shards and storing for subsequent use. In some examples, the client application on the target device 325 notifies the custodial token platform 310 of completion of the clone operation, and the custodial token platform 310 may delete the encrypted payload 340 from the data store. Further, the custodial token platform 310 may delete the encrypted payload 340 after a preconfigured period of time. In some examples, the target device 325 may prompt for passcode entry and biometric authentication or configuration before allowing utilization of the cloned private key.

As such, the private key shard may be used by both the source device 305 and the target device 325 in association with the custodial token platform 310. Further, the key shard is securely communicated between the source device 305 and the target device 325 via the custodial token platform 310 without exposing the key shard to the custodial token platform 310.

Figure 4:
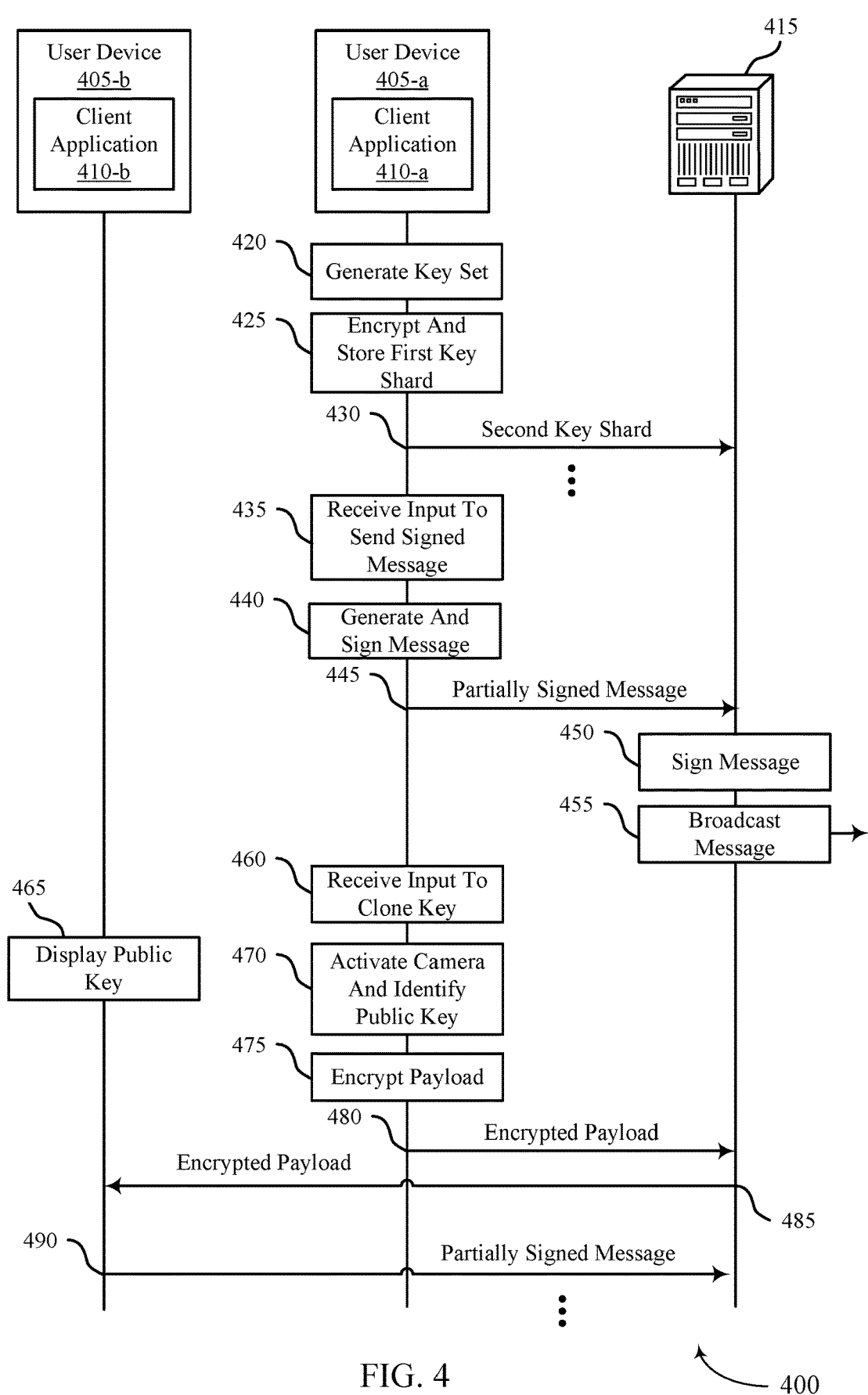
FIG. 4 illustrates an example of a process flow that supports a multi-party computation self-custody wallet in accordance with aspects of the present disclosure.

FIG. 4 illustrates an example of a process flow 400 that supports a multi-party computation self-custody wallet in accordance with aspects of the present disclosure. The process flow 400 may include a user device 405-*a* with a client application 410-*a*, a user device 405-*b* with a client application 410-*b*, and one or more servers 415 that support a custodial token platform. The user devices 405 may be examples of the user devices as described with respect to FIGS. 1 through 3 and the one or more servers 415 may be an example of the servers that support a custodial token platform as described with respect to FIGS. 1 through 3. The client applications 410 may be examples of client applications and/or wallet applications as described herein. In the following description of the process flow 400, the operations between the user device 405-*a*, the user device 405-*b*, and the one or more servers 415 may be transmitted in a different order than the example order shown, or the operations performed may be performed in different orders or at different times. Some operations may also be omitted from the process flow 400, and other operations may be added to the process flow 400.

At 420, the user device 405-*a* may generate a key set. For example, the client application 410-*a* may generate the key set using facilities of the user device 405-*a*, such as a trusted execution environment. The key set may include one or more private keys and one or more public keys, and the one or more public keys may be used by the client application 410-*a* as wallet addresses for blockchain interaction and functionality. In some examples, the private key or the key set is generated by another service and communicated to the user device 405-*a*.

At 425, the user device 405-*a* may encrypt and store a first key shard of the private key. The first key shard may be encrypted using an key (e.g., encryption/decryption key) that is stored in the trusted execution environment of the user device 405-*a*. The encrypted key shard may be stored for access by the client application 410-*a* for signing messages.

At 430, the user device 405-*a* may transmit, and the one or more servers may receive, an indication of a second key shard of the private key. The key shard may be communicated using a secure communication protocol. For example, the second key shard may be encrypted by the user device, communicated to the one or more servers 415, and decrypted by the one or more servers 415. The one or more servers 415 may store the second key shard in association with a user profile for the user of the user device 405-*a*.

At 435, the user device 405-*a* may receive, at a user interface of the first client application 410-*a*, a first request to broadcast a message to a blockchain network supported distributed data store. For example, the user may access the user interface to indicate a transfer of one or more crypto tokens from an address associated with the client application 410-*a* to another address via the blockchain network. The user may indicate the token type, token amount, gas fees, etc. via the user interface. At 440, the client application 410-*a* may generate and sign a message in response to receiving the request. The message is signed using the key shard stored at the user device 405-*a*. For example, the user device may retrieve the decryption key from the trusted execution environment, decrypt the key shard, and sign the message using the decrypted key shard. Signing the message using the key shard may result in a partially signed message.

At 445, the one or more servers 415 of the custodial token platform may receive, from the first client application 410-*a* on the first user device 405-*a*, the partially signed message that is signed by the first client application using the first key shard stored at the first user device 405-*a*. The first key shard is associated with the first private key that is generated by the user device 405-*a* or another service and communicated to the user device 405-*a*. The partially signed message may be transmitted to the one or more servers 415 using an API endpoint or via another communication protocol.

At 450, the one or more servers 415 of the custodial token platform may sign the partially signed message using the second key shard stored at the one or more servers to generate a fully signed message. The second key shard is associated with the first private key.

At 455, the one or more servers 415 of the custodial token platform may broadcast, to the blockchain network supported distributed data store and after signing the partially signed message, the fully signed message.

At 460, the client application 410-*a* of the user device 405-*a* may receive a request to use the private key at a second client application. For example, the user device 405-*a* receives a request to clone the first key shard to the second client application 410-*b*. The user may activate user interface component (e.g., button) of the user interface to request to clone the first key shard.

At 470, the client application 410-*a* of the user device 405-*a* may activate, after receiving the request, a camera of the user device 405-*a* and identify the public key (e.g., wallet address) of the second client application 410-*b* using the camera. For example, the camera may be used to scan a QR code associated with the public key of the second client application 410-*b*. Thus, at 465, the second client application 410-*b* of the user device 405-*b* may display an indication of the public key, such as the QR code corresponding to the public key. At 475, the user device 405-*a* may encrypt, using the public key of the second client application 410-*b*, a payload comprising the first key shard to generate an encrypted payload.

At 480, the user device 405-*a* may transmit, and the one or more servers 415 may receive, the encrypted payload that is encrypted using the public key associated with the second client application 410-*b* on a second user device 405-*b*. The encrypted payload includes the first key shard.

At 485, the one or more servers 415 of the custodial token platform may transmit, and the user device 405-*b* may receive, the encrypted payload for decryption by the second client application 410-*b* on the second user device 405-*b* using a second private key associated with the public key. The second user device 405-*b* may then use the first key shard to access and use resources of the custodial token platform. For example, at 490, the one or more servers 415 may receive, from the second client application 410-*b* on the second user device 405-*b* a second partially signed message that is signed by the first key shard stored on the second user device 405-*b*. The custodial token platform on the one or more servers 415 may then sign the second partially signed message using the second key shard stored at the one or more servers to generate a second fully signed message and broadcast to the blockchain network supported distributed data store, the second fully signed message.

Figure 5:
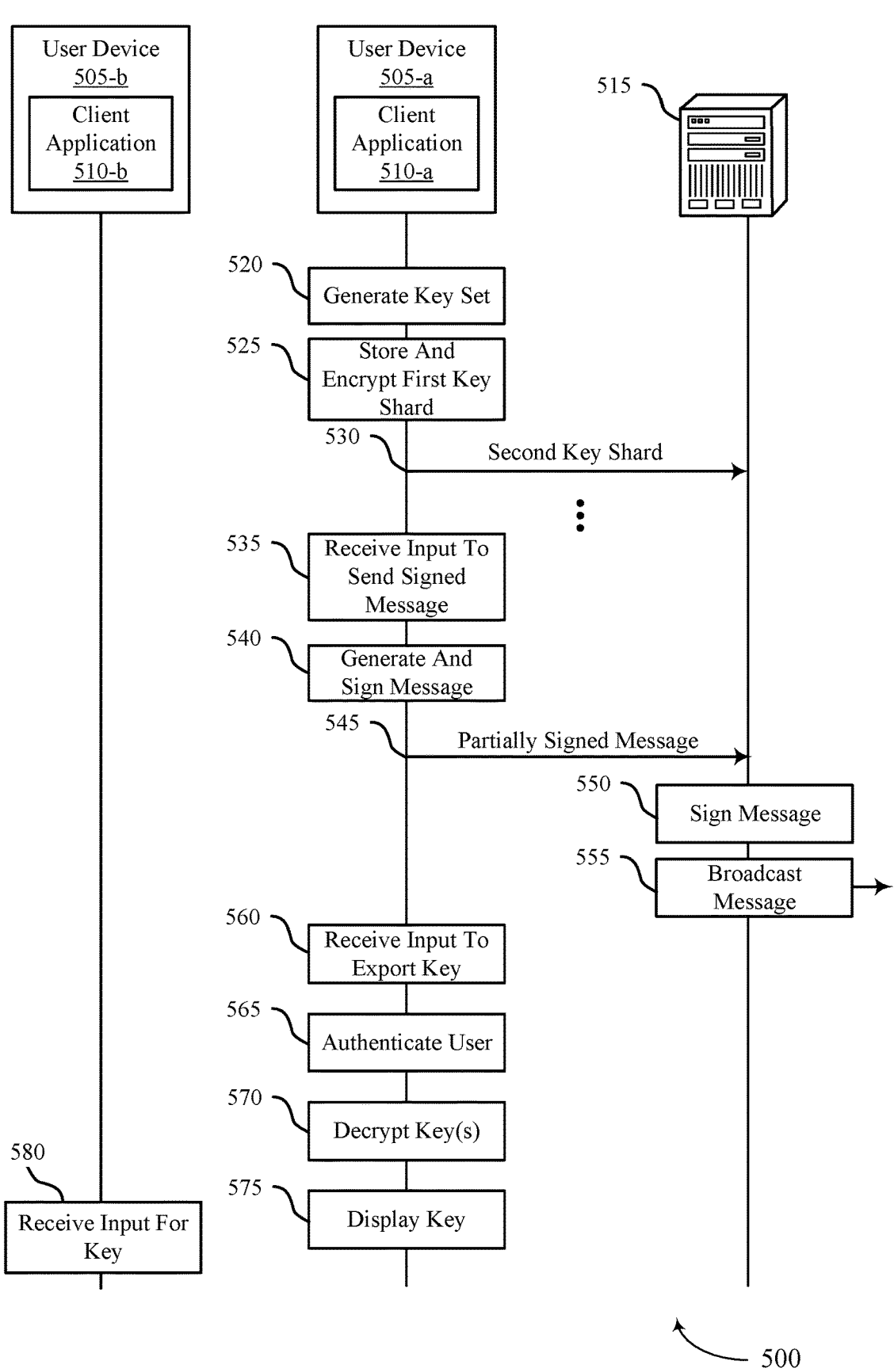
FIG. 5 illustrates an example of a process flow that supports a multi-party computation self-custody wallet in accordance with aspects of the present disclosure.

FIG. 5 illustrates an example of a process flow 500 that supports a multi-party computation self-custody wallet in accordance with aspects of the present disclosure. The process flow 500 may include a user device 505-*a* with a client application 510-*a*, a user device 505-*b* with a client application 510-*b*, and one or more servers 515 that support a custodial token platform. The user devices 505 may be examples of the user devices as described with respect to FIGS. 1 through 4 and the one or more servers 515 may be an example of the servers that support a custodial token platform as described with respect to FIGS. 1 through 4. The client applications 510 may be examples of client applications and/or wallet applications as described herein. In the following description of the process flow 500, the operations between the user device 505-*a*, the user device 505-*b*, and the one or more servers 515 may be transmitted in a different order than the example order shown, or the operations performed may be performed in different orders or at different times. Some operations may also be omitted from the process flow 500, and other operations may be added to the process flow 500.

At 520, the user device 505-*a* may generate a key set. For example, the client application 510-*a* may generate the key set using facilities of the user device 505-*a*, such as a trusted execution environment. The key set may include one or more private keys and one or more public keys, and the one or more public keys may be used by the client application 510-*a* as wallet addresses for blockchain interaction and functionality. In some examples, the private key or the key set is generated by another service and communicated to the user device 505-*a*.

At 525, the user device 505-*a* may encrypt and store a first key shard of the private key. The first key shard may be encrypted using an key (e.g., encryption/decryption key) that is stored in the trusted execution environment of the user device 505-*a*. The encrypted key shard may be stored for access by the client application 510-*a* for signing messages.

At 530, the user device 505-*a* may transmit, and the one or more servers may receive, an indication of a second key shard of the private key. The key shard may be communicated using a secure communication protocol. For example, the second key shard may be encrypted by the user device, communicated to the one or more servers 515, and decrypted by the one or more servers 515. The one or more servers 515 may store the second key shard in association with a user profile for the user of the user device 505-*a*.

At 535, the user device 505-*a* may receive, at a user interface of the first client application 510-*a*, a first request to broadcast a message to a blockchain network supported distributed data store. For example, the user may access the user interface to indicate a transfer of one or more crypto tokens from an address associated with the client application 510-*a* to another address via the blockchain network. The user may indicate the token type, token amount, gas fees, etc. via the user interface. At 540, the client application 510-*a* may generate and sign a message in response to receiving the request. The message is signed using the key shard stored at the user device 505-*a*. For example, the user device may retrieve the decryption key from the trusted execution environment, decrypt the key shard, and sign the message using the decrypted key shard. Signing the message using the key shard may result in a partially signed message.

At 545, the one or more servers 515 of the custodial token platform may receive, from the first client application 510-*a* on the first user device 505-*a*, the partially signed message that is signed by the first client application using the first key shard stored at the first user device 505-*a*. The first key shard is associated with the first private key that is generated by the user device 505-*a* or another service and communicated to the user device 505-*a*. The partially signed message may be transmitted to the one or more servers 515 using an API endpoint or via another communication protocol.

At 550, the one or more servers 515 of the custodial token platform may sign the partially signed message using the second key shard stored at the one or more servers to generate a fully signed message. The second key shard is associated with the first private key.

At 555, the one or more servers 515 of the custodial token platform may broadcast, to the blockchain network supported distributed data store and after signing the partially signed message, the fully signed message.

At 560, the client application 510-*a* of the user device 505-*a* may receive a request to use the private key at a second client application. For example, the user device 505-*a* receives a request to export the private key to another application or device, such as the client application 510-*b* on the second user device 505-*b*. The user may activate user interface component (e.g., button) of the user interface to request to export the private key.

At 565, the client application 510-*a* on the user device 505-*a* may authenticate, after receiving the request, the user of the user device using one or both of a passcode and a biometric authentication process. The authentication procedure may leverage operating system supported authentication techniques.

At 570, the client application 510-*a* on the user device 505-*a* may decrypt after authenticating the user, a copy of the second key shard. In some examples, the client application 510-*a* retrieves the first and/or second key shard from local backups of the key shards stored in the secure enclave of the user device 505-*a*. The client application 510-*a* on the user device 505-*a* may generate the private key using the key shards. At 575, the client application 510-*a* may display an indication of the private key. This displayed indication may include a seed phrase (mnemonic) corresponding to the private key or may include the alphanumeric version of the private key. At 580, the client application 510-*b* may receive input for the private key. In some examples, the private key (or seed phrase) may be entered in the second client application 510-*b*.

Figure 6:
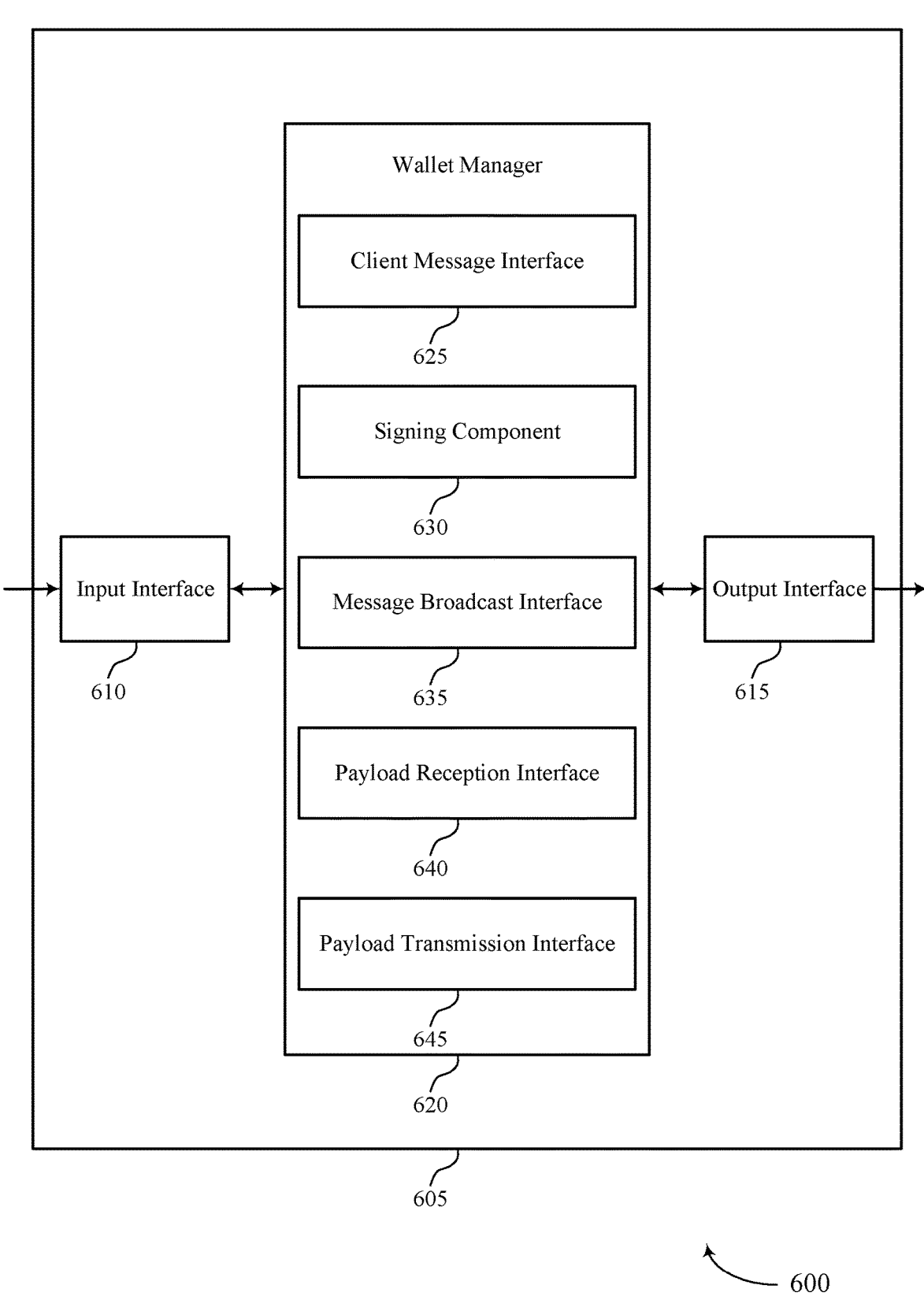
FIG. 6 illustrates a block diagram of an apparatus that supports a multi-party computation self-custody wallet in accordance with aspects of the present disclosure.

FIG. 6 illustrates a block diagram 600 of a system 605 that supports a multi-party computation self-custody wallet in accordance with aspects of the present disclosure. In some examples, the system 605 may be an example of aspects of one or more components described with reference to FIG. 1, such as a custodial token platform 110. The system 605 may include an input interface 610, an output interface 615, and a wallet manager 620. The system 605 may also include one or more processors. Each of these components may be in communication with one another (e.g., via one or more buses, communications links, communications interfaces, or any combination thereof). The system 605 may be an example of one or more servers supporting a custodial token platform 110, as described herein.

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the wallet manager 620 to support multi-party computation self-custody wallet. In some cases, the input interface 610 may be a component of a network interface 825 as described with reference to FIG. 8.

The output interface 615 may manage output signaling for the system 605. For example, the output interface 615 may receive signaling from other components of the system 605, such as the wallet manager 620, and may transmit such output signaling corresponding to (e.g., representative of or otherwise based on) such signaling to other systems or devices. In some cases, the output interface 615 may be a component of a network interface 825 as described with reference to FIG. 8.

For example, the wallet manager 620 may include a client message interface 625, a signing component 630, a message broadcast interface 635, a payload reception interface 640, a payload transmission interface 645, or any combination thereof. In some examples, the wallet manager 620, or various components thereof, may be configured to perform various operations (e.g., receiving, monitoring, transmitting) using or otherwise in cooperation with the input interface 610, the output interface 615, or both. For example, the wallet manager 620 may receive information from the input interface 610, send information to the output interface 615, or be integrated in combination with the input interface 610, the output interface 615, or both to receive information, transmit information, or perform various other operations as described herein.

The wallet manager 620 may support data processing in accordance with examples as disclosed herein. The client message interface 625 may be configured as or otherwise support a means for receiving, at a custodial token platform on one or more servers and from a first client application on a first user device, a partially signed message that is signed by the first client application using a first key shard stored at the first user device, where the first key shard is associated with a first private key. The signing component 630 may be configured as or otherwise support a means for signing, at the custodial token platform on the one or more servers, the partially signed message using a second key shard stored at the one or more servers to generate a fully signed message, where the second key shard is associated with the first private key. The message broadcast interface 635 may be configured as or otherwise support a means for broadcasting, to a blockchain network supported distributed data store and after signing the partially signed message, the fully signed message. The payload reception interface 640 may be configured as or otherwise support a means for receiving, at the custodial token platform on the one or more servers and from the first client application on the first user device, an encrypted payload that is encrypted using a public key associated with a second client application on a second user device, the encrypted payload including the first key shard. The payload transmission interface 645 may be configured as or otherwise support a means for transmitting, to the second client application on the second user device, the encrypted payload for decryption by the second client application on the second user device using a second private key associated with the public key.

Figure 7:
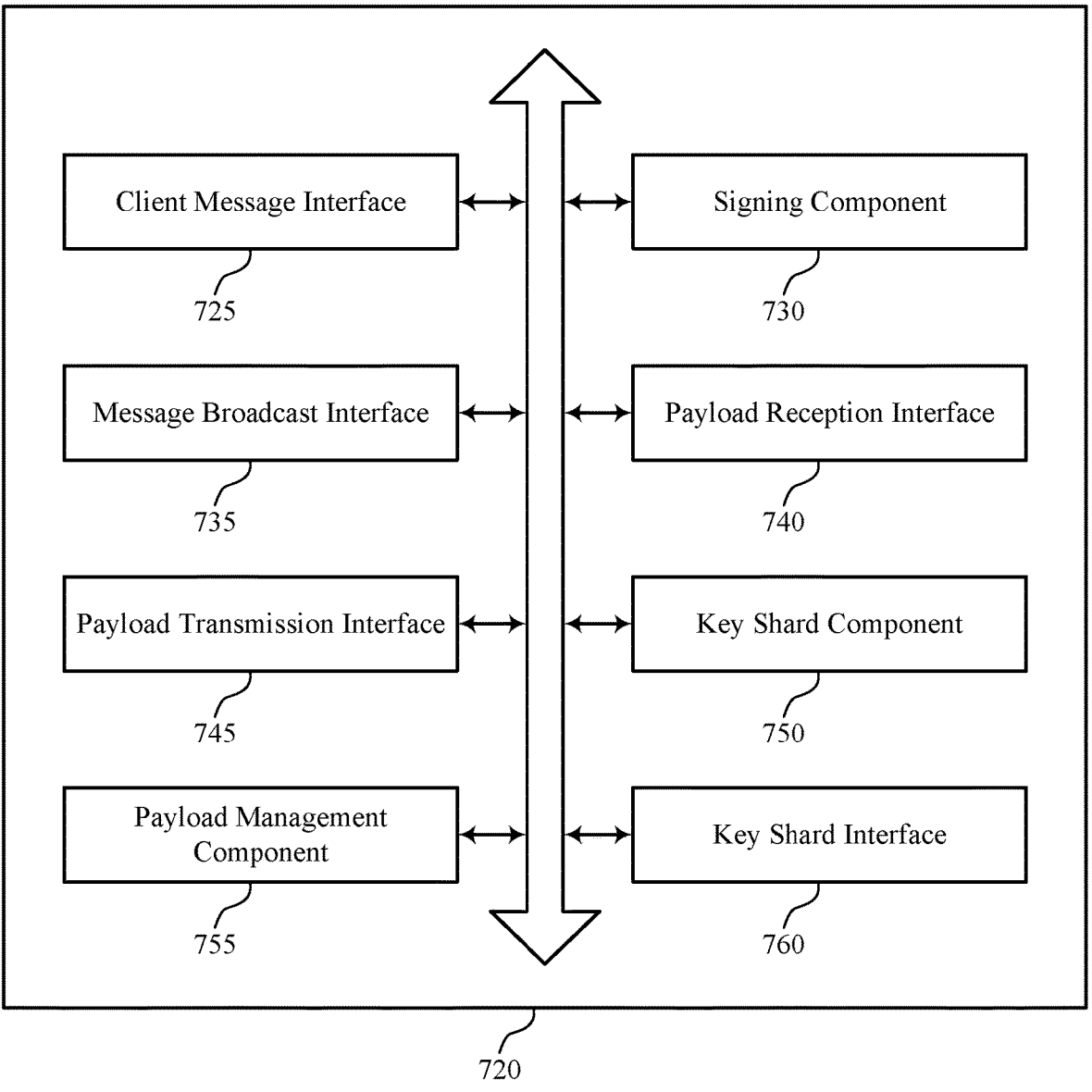
FIG. 7 illustrates a block diagram of a wallet manager that supports a multi-party computation self-custody wallet in accordance with aspects of the present disclosure.

FIG. 7 illustrates a block diagram 700 of a wallet manager 720 that supports a multi-party computation self-custody wallet in accordance with aspects of the present disclosure. The wallet manager 720 may be an example of aspects of a wallet manager or a wallet manager 620, or both, as described herein. The wallet manager 720, or various components thereof, may be an example of means for performing various aspects of a multi-party computation self-custody wallet as described herein. For example, the wallet manager 720) may include a client message interface 725, a signing component 730, a message broadcast interface 735, a payload reception interface 740, a payload transmission interface 745, a key shard component 750), a payload management component 755, a key shard interface 760, or any combination thereof. Each of these components may communicate, directly or indirectly, with one another (e.g., via one or more buses, communications links, communications interfaces, or any combination thereof).

The wallet manager 720 may support data processing in accordance with examples as disclosed herein. The client message interface 725 may be configured as or otherwise support a means for receiving, at a custodial token platform on one or more servers and from a first client application on a first user device, a partially signed message that is signed by the first client application using a first key shard stored at the first user device, where the first key shard is associated with a first private key. The signing component 730 may be configured as or otherwise support a means for signing, at the custodial token platform on the one or more servers, the partially signed message using a second key shard stored at the one or more servers to generate a fully signed message, where the second key shard is associated with the first private key. The message broadcast interface 735 may be configured as or otherwise support a means for broadcasting, to a blockchain network supported distributed data store and after signing the partially signed message, the fully signed message. The payload reception interface 740 may be configured as or otherwise support a means for receiving, at the custodial token platform on the one or more servers and from the first client application on the first user device, an encrypted payload that is encrypted using a public key associated with a second client application on a second user device, the encrypted payload including the first key shard. The payload transmission interface 745 may be configured as or otherwise support a means for transmitting, to the second client application on the second user device, the encrypted payload for decryption by the second client application on the second user device using a second private key associated with the public key.

In some examples, the client message interface 725 may be configured as or otherwise support a means for receiving, at the custodial token platform on the one or more servers and from the second client application on the second user device, a second partially signed message that is signed by the first key shard stored on the second user device. In some examples, the signing component 730 may be configured as or otherwise support a means for signing, at the custodial token platform on the one or more servers, the second partially signed message using the second key shard stored at the one or more servers to generate a second fully signed message. In some examples, the message broadcast interface 735 may be configured as or otherwise support a means for broadcasting, to the blockchain network supported distributed data store, the second fully signed message.

In some examples, the key shard component 750 may be configured as or otherwise support a means for transmitting, with the encrypted payload and to the second client application on the second user device, the second key shard of the first private key.

In some examples, the payload management component 755 may be configured as or otherwise support a means for deleting, from the custodial token platform, the encrypted payload after transmitting the encrypted payload to the second client application.

In some examples, the payload management component 755 may be configured as or otherwise support a means for generating, after receiving the encrypted payload, a copy of the second key shard, wherein the copy of the second key shard is used for signing partially signed messages received from the second client application.

In some examples, to support broadcasting the fully signed message, the message broadcast interface 735 may be configured as or otherwise support a means for broadcasting the fully signed message that is configured to cause transfer of a crypto token from a wallet address associated with the first client application to another wallet address via the blockchain network supported distributed data store.

In some examples, the key shard interface 760 may be configured as or otherwise support a means for receiving, from the first client application on the first user device and prior to receiving the partially signed message, an indication of the second key shard.

Figure 8:
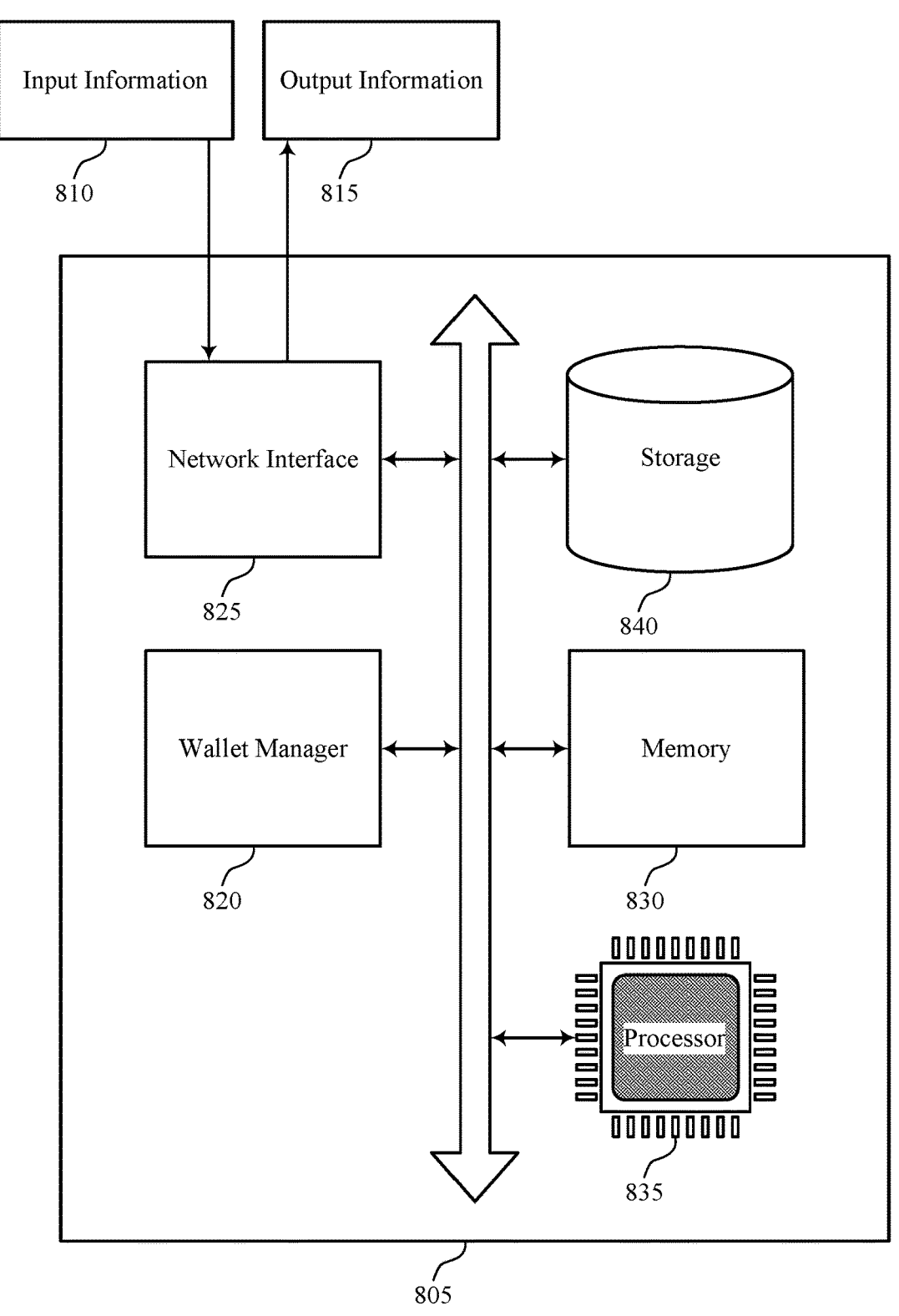
FIG. 8 illustrates a diagram of a system including a device that supports a multi-party computation self-custody wallet in accordance with aspects of the present disclosure.

FIG. 8 illustrates a block diagram 800 of a system 805 that supports a multi-party computation self-custody wallet in accordance with aspects of the present disclosure. The system 805 may be an example of or include the components of a system 605 as described herein. The system 805 may include components for data management, including components such as a wallet manager 820, an input information 810, an output information 815, a network interface 825, a memory 830, a processor 835, and a storage 840. These components may be in electronic communication or otherwise coupled with each other (e.g., operatively, communicatively, functionally, electronically, electrically: via one or more buses, communications links, communications interfaces, or any combination thereof). Additionally, the components of the system 805 may include corresponding physical components or may be implemented as corresponding virtual components (e.g., components of one or more virtual machines). In some examples, the system 805 may be an example of aspects of one or more components described with reference to FIG. 1, such as a custodial token platform 110. For example, the system 805 may be an example of one or more servers supporting the custodial token platform 110.

The network interface 825 may enable the system 805 to exchange information (e.g., input information 810, output information 815, or both) with other systems or devices (not shown). For example, the network interface 825 may enable the system 805 to connect to a network (e.g., a network 135 as described herein). The network interface 825 may include one or more wireless network interfaces, one or more wired network interfaces, or any combination thereof.

Memory 830 may include RAM, ROM, or both. The memory 830 may store computer-readable, computer-executable software including instructions that, when executed, cause the processor 835 to perform various functions described herein. In some cases, the memory 830 may contain, among other things, a basic input/output system (BIOS), which may control basic hardware or software operation such as the interaction with peripheral components or devices. In some cases, the memory 830 may be an example of aspects of one or more components described with reference to FIG. 1.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in a memory 830 to perform various functions (e.g., functions or tasks supporting multi-party computation self-custody wallet). Though a single processor 835 is depicted in the example of FIG. 8, it is to be understood that the system 805 may include any quantity of one or more of processors 835 and that a group of processors 835 may collectively perform one or more functions ascribed herein to a processor, such as the processor 835.

Storage 840 may be configured to store data that is generated, processed, stored, or otherwise used by the system 805. In some cases, the storage 840 may include one or more HDDs, one or more SDDs, or both. In some examples, the storage 840 may be an example of a single database, a distributed database, multiple distributed databases, a data store, a data lake, or an emergency backup database.

The wallet manager 820 may support data processing in accordance with examples as disclosed herein. For example, the wallet manager 820 may be configured as or otherwise support a means for receiving, at a custodial token platform on one or more servers and from a first client application on a first user device, a partially signed message that is signed by the first client application using a first key shard stored at the first user device, where the first key shard is associated with a first private key. The wallet manager 820 may be configured as or otherwise support a means for signing, at the custodial token platform on the one or more servers, the partially signing message using a second key shard stored at the one or more servers to generate a fully signed message, where the second key shard is associated with the first private key. The wallet manager 820 may be configured as or otherwise support a means for broadcasting, to a blockchain network supported distributed data store and after signing the partially signed message, the fully signed message. The wallet manager 820) may be configured as or otherwise support a means for receiving, at the custodial token platform on the one or more servers and from the first client application on the first user device, an encrypted payload that is encrypted using a public key associated with a second client application on a second user device, the encrypted payload including the first key shard. The wallet manager 820 may be configured as or otherwise support a means for transmitting, to the second client application on the second user device, the encrypted payload for decryption by the second client application on the second user device using a second private key associated with the public key.

By including or configuring the wallet manager 820 in accordance with examples as described herein, the system 805 may support techniques for multi-party computation self-custody wallet, which may provide one or more benefits such as, for example, improved security and key management, and improved user experience, among other possibilities.

Figure 9:
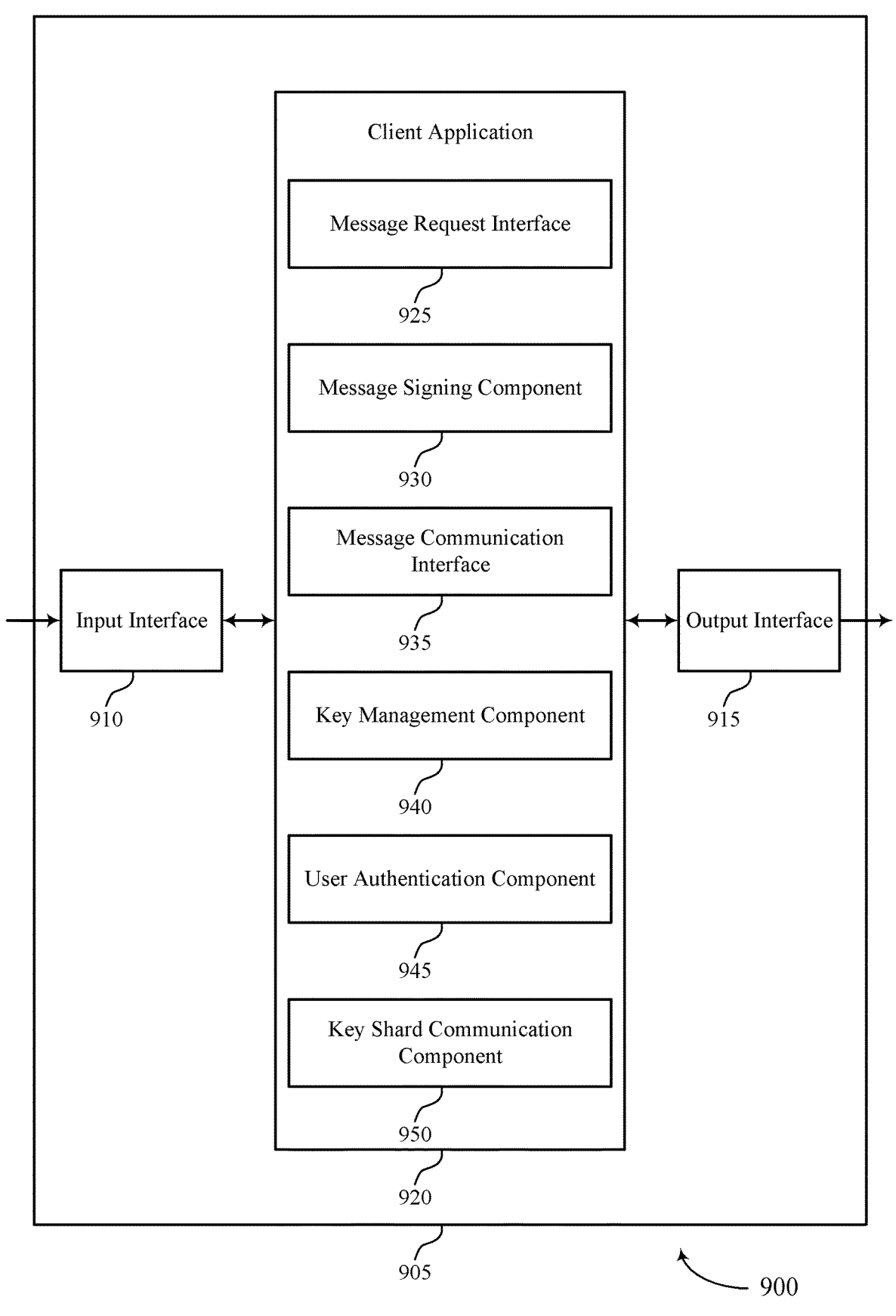
FIG. 9 illustrates a block diagram of an apparatus that supports a multi-party computation self-custody wallet in accordance with aspects of the present disclosure.

FIG. 9 illustrates a block diagram 900 of a system 905 that supports a multi-party computation self-custody wallet in accordance with aspects of the present disclosure. In some examples, the system 905 may be an example of aspects of one or more components described with reference to FIG. 1, such as a computing device 140. The system 905 may include an input interface 910, an output interface 915, and a client application 920. The system 905 may also include one or more processors. Each of these components may be in communication with one another (e.g., via one or more buses, communications links, communications interfaces, or any combination thereof).

The input interface 910 may provide a means for receiving information such as packets, user data, control information, or any combination thereof associated with various information channels (e.g., control channels, data channels, information channels related to wallet management and blockchain transaction techniques). Information may be passed on to other components of the system 905. The input interface 910 may utilize a single antenna or a set of multiple antennas.

The output interface 915 may provide a means for transmitting signals generated by other components of the system 905. For example, the output interface 915 may transmit information such as packets, user data, control information, or any combination thereof associated with various information channels (e.g., control channels, data channels, information channels related to wallet management and blockchain transaction techniques techniques). In some examples, the output interface 915 may be co-located with the input interface 910 in a transceiver module. The output interface 915 may utilize a single antenna or a set of multiple antennas.

The client application 920 may include a message request interface 925, a message signing component 930, a message communication interface 935, a key management component 940, a user authentication component 945, a key shard communication component 950, or any combination thereof. In some examples, the client application 920, or various components thereof, may be configured to perform various operations (e.g., receiving, monitoring, transmitting) using or otherwise in cooperation with the input interface 910, the output interface 915, or both. For example, the client application 920 may receive information from the input interface 910, send information to the output interface 915, or be integrated in combination with the input interface 910, the output interface 915, or both to receive information, transmit information, or perform various other operations as described herein. In some cases, the client application 920 may be an example of a client application or wallet application as described herein.

The client application 920 may support data processing and key management in accordance with examples as disclosed herein. The message request interface 925 may be configured as or otherwise support a means for receiving, at a user interface of a first client application, a first request to broadcast a message to a blockchain network supported distributed data store. The message signing component 930 may be configured as or otherwise support a means for signing, after receiving the first request, the message using a first key shard of a private key to generate a partially signed message, the private key generated on a user device that executes the first client application. The message communication interface 935 may be configured as or otherwise support a means for transmitting the partially signed message to a custodial token platform that is configured to sign the partially signed message using a second key shard of the private key and broadcast a resulting fully signed message to the blockchain network supported distributed data store. The key management component 940) may be configured as or otherwise support a means for receiving, at the user interface of the first client application, a second request to use the private key at a second client application. The user authentication component 945 may be configured as or otherwise support a means for authenticating, after receiving the second request, a user of the user device using one or both of a passcode and a biometric authentication process. The key shard communication component 950) may be configured as or otherwise support a means for communicating, after authenticating the user, an indication of at least the first key shard.

Figure 10:
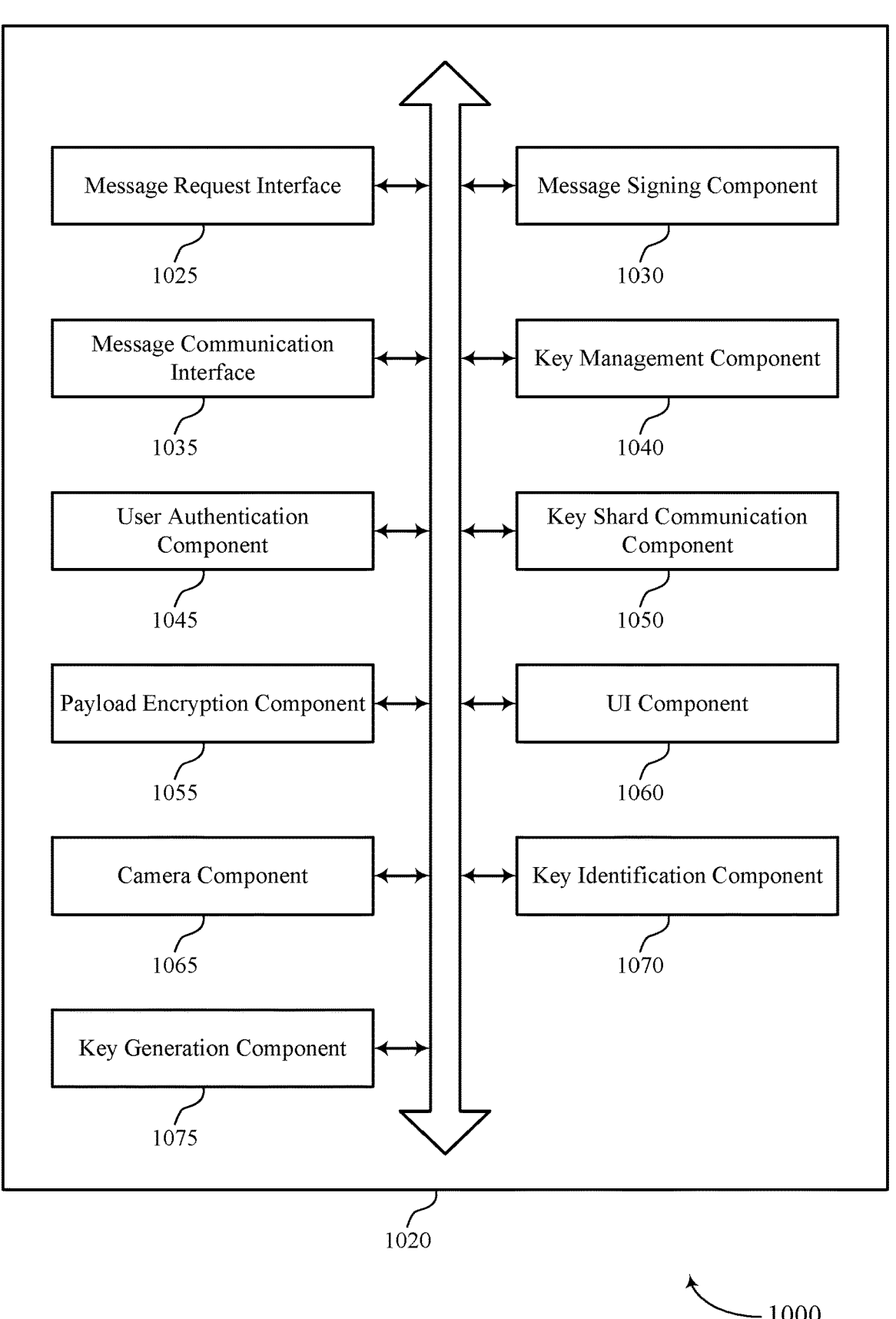
FIG. 10 illustrates a block diagram of a wallet application that supports a multi-party computation self-custody wallet in accordance with aspects of the present disclosure.

FIG. 10 illustrates a block diagram 1000 of a client application 1020 that supports a multi-party computation self-custody wallet in accordance with aspects of the present disclosure. The client application 1020 may be an example of aspects of a client application or a client application 920, or both, as described herein. The client application 1020, or various components thereof, may be an example of means for performing various aspects of a multi-party computation self-custody wallet as described herein. For example, the client application 1020 may include a message request interface 1025, a message signing component 1030, a message communication interface 1035, a key management component 1040, a user authentication component 1045, a key shard communication component 1050, a payload encryption component 1055, a UI component 1060, a camera component 1065, a key identification component 1070, a key generation component 1075, or any combination thereof. Each of these components may communicate, directly or indirectly, with one another (e.g., via one or more buses, communications links, communications interfaces, or any combination thereof).

The client application 1020 may support data processing in accordance with examples as disclosed herein. The message request interface 1025 may be configured as or otherwise support a means for receiving, at a user interface of a first client application, a first request to broadcast a message to a blockchain network supported distributed data store. The message signing component 1030 may be configured as or otherwise support a means for signing, after receiving the first request, the message using a first key shard of a private key to generate a partially signed message, the private key generated on a user device that executes the first client application. The message communication interface 1035 may be configured as or otherwise support a means for transmitting the partially signed message to a custodial token platform that is configured to sign the partially signed message using a second key shard of the private key and broadcast a resulting fully signed message to the blockchain network supported distributed data store. The key management component 1040 may be configured as or otherwise support a means for receiving, at the user interface of the first client application, a second request to use the private key at a second client application. The user authentication component 1045 may be configured as or otherwise support a means for authenticating, after receiving the second request, a user of the user device using one or both of a passcode and a biometric authentication process. The key shard communication component 1050 may be configured as or otherwise support a means for communicating, after authenticating the user, an indication of at least the first key shard.

In some examples, the key management component 1040 may be configured as or otherwise support a means for decrypting, after authenticating the user, a copy of the second key shard, the first key shard and the second key shard used to generate the private key, and where communicating the indication includes transmitting an indication of the private key.

In some examples, to support transmitting the indication of the private key, the UI component 1060 may be configured as or otherwise support a means for displaying, at the user device, the indication of the private key.

In some examples, the second request includes a request to export the private key via the first client application.

In some examples, the payload encryption component 1055 may be configured as or otherwise support a means for encrypting, after receiving the second request and using a public key of a second client application, a payload including the first key shard to generate an encrypted payload, where communicating the indication of at least the first key shard includes transmitting, to the custodial token platform, the encrypted payload.

In some examples, the camera component 1065 may be configured as or otherwise support a means for activating, after receiving the second request, a camera of the user device. In some examples, the key identification component 1070 may be configured as or otherwise support a means for identifying the public key of the second client application using the camera of the user device.

In some examples, to support identifying the public key, the camera component 1065 may be configured as or otherwise support a means for scanning, using the camera, a quick response (QR) code associated with the public key.

In some examples, the second request includes a request to clone the first key shard to the second client application.

In some examples, the key generation component 1075 may be configured as or otherwise support a means for generating, at the user device, the private key. In some examples, the key management component 1040 may be configured as or otherwise support a means for storing a backup of the first key shard and the second key shard in a secure enclave of the user device. In some examples, the key management component 1040 may be configured as or otherwise support a means for encrypting the first key shard using an encryption key that is stored in the secure enclave of the user device. In some examples, the key shard communication component 1050 may be configured as or otherwise support a means for transmitting, to the custodial token platform, an indication of the second key shard.

Figure 11:
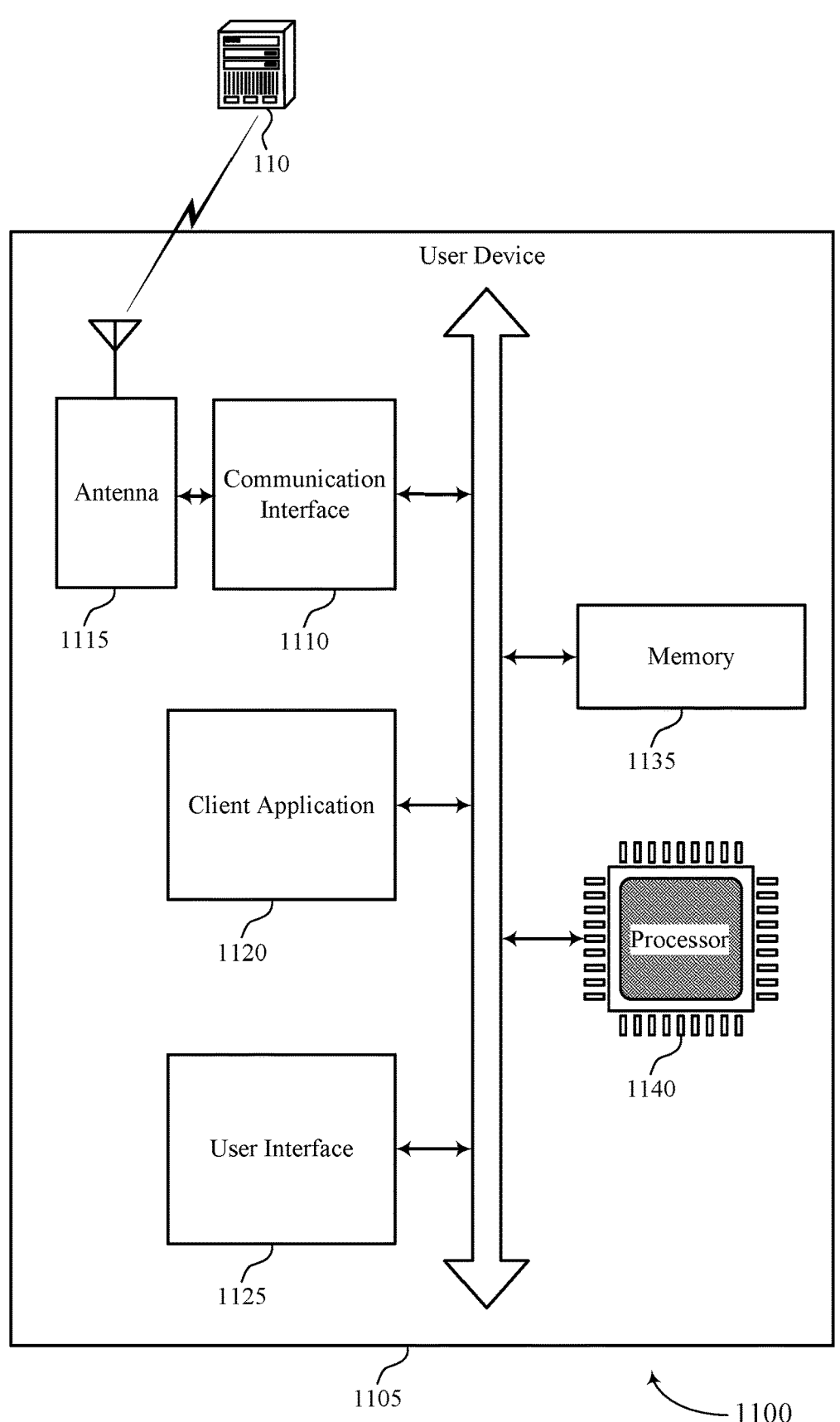
FIG. 11 illustrates a diagram of a system including a device that supports a multi-party computation self-custody wallet in accordance with aspects of the present disclosure.

FIG. 11 illustrates a block diagram 1100 of a system 1105 that supports a multi-party computation self-custody wallet in accordance with aspects of the present disclosure. The system 1105 may be an example of or include the components of a system 905 as described herein. The system 1105 may include components for data management, including components such as a client application 1120, a communication interface 1110, an antenna 1115, a user interface 1125, a memory 1135, and a processor 1140. These components may be in electronic communication or otherwise coupled with each other (e.g., operatively, communicatively, functionally, electronically, electrically: via one or more buses, communications links, communications interfaces, or any combination thereof). Additionally, the components of the system 1105 may include corresponding physical components or may be implemented as corresponding virtual components (e.g., components of one or more virtual machines). In some examples, the system 1105 may be an example of aspects of one or more components described with reference to FIG. 1, such as a custodial token platform 110.

The communication interface 1110 may manage input and output signals for the system 1105 via the antenna 1115. In this regard, the communication interface 1110 may manage communications with the custodial token platform 110 (which may be supported by one or more servers) via one or more networks, as illustrated in FIG. 1. The communication interface 1110 may also manage peripherals not integrated into the system 1105. In some cases, the communication interface 1110 may represent a physical connection or port to an external peripheral. In some cases, the communication interface 1110 may utilize an operating system such as iOSR, ANDROIDR, MS-DOSR, MS-WINDOWS®, OS/2R, UNIXR, LINUXR, or another known operating system.

In some cases, the system 1105 may include a single antenna 1115. However, in some other cases, the system 1105 may have more than one antenna 1115, which may be capable of concurrently transmitting or receiving multiple wireless transmissions. The communication interface 1110 may communicate bi-directionally, via the one or more antennas 1115, wired, or wireless links as described herein. For example, the communication interface 1110 may represent a wireless transceiver and may communicate bi-directionally with another wireless transceiver. The communication interface 1110 may also include a modem to modulate the packets, to provide the modulated packets to one or more antennas 1115 for transmission, and to demodulate packets received from the one or more antennas 1115.

The communication interface 1110 may represent or interact with a modem, a keyboard, a mouse, a touchscreen, or a similar device. In some cases, the user interface 1125 may be implemented as part of the processor 1140. In some examples, a user may interact with the system 1105 via the communication interface 1110, user interface 1125, or via hardware components controlled by the communication interface 1110. The user interface may be accessed by user to access and view data, active user interface components (e.g., displayed buttons), and activate processes or procedure as described herein. In some cases, a user may interact with the user interface 1125. In other cases, the user interface 1125 may operate automatically without user interaction.

The memory 1135 may include RAM and ROM. The memory 1135 may store computer-readable, computer-executable software including instructions that, when executed, cause the processor 1140 to perform various functions described herein. In some cases, the memory 1135 may contain, among other things, a BIOS which may control basic hardware or software operation such as the interaction with peripheral components or devices. The memory 1135 may also store application data, user data, and the like that is accessed by the computer-executable instructions.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory 1135 to perform various functions (e.g., functions or tasks supporting a multi-party computation self-custody wallet).

The client application 1120 may support data processing in accordance with examples as disclosed herein. For example, the client application 1120) may be configured as or otherwise support a means for receiving, at a user interface of a first client application, a first request to broadcast a message to a blockchain network supported distributed data store. The client application 1120 may be configured as or otherwise support a means for signing, after receiving the first request, the message using a first key shard of a private key to generate a partially signed message, the private key generated on a user device that executes the first client application. The client application 1120 may be configured as or otherwise support a means for transmitting the partially signed message to a custodial token platform that is configured to sign the partially signed message using a second key shard of the private key and broadcast a resulting fully signed message to the blockchain network supported distributed data store. The client application 1120 may be configured as or otherwise support a means for receiving, at the user interface of the first client application, a second request to use the private key at a second client application. The client application 1120 may be configured as or otherwise support a means for authenticating, after receiving the second request, a user of the user device using one or both of a passcode and a biometric authentication process. The client application 1120 may be configured as or otherwise support a means for communicating, after authenticating the user, an indication of at least the first key shard.

By including or configuring the client application 1120 in accordance with examples as described herein, the system 1105 may support techniques for a multi-party computation self-custody wallet, which may provide one or more benefits such as, for example, improved security in key management, improved user experience in exporting or cloning keys, among other possibilities.

The client application 1120 may be an application (e.g., "app"), program, software, or other component which is configured to facilitate communications with a custodial token platform 110 on a server, a blockchain network 105, other user devices, and the like. For example, the client application 1120 may be an application executable on a user device that is configured to receive data from a custodial token platform 110, transmit data to the custodial token platform 110, and cause presentation of data to a user, and/or receive input from a user. The client application may be an example of a client application and may be associated with a wallet address and may access or use aspects of a private key to sign messages to facilitate transfer of crypto tokens.

FIG. 12 illustrates a flowchart showing a method 1200 that supports a multi-party computation self-custody wallet in accordance with aspects of the present disclosure. The operations of the method 1200 may be implemented by a custodial token platform or its components as described herein. For example, the operations of the method 1200 may be performed by a custodial token platform as described with reference to FIGS. 1 through 8. In some examples, a custodial token platform may execute a set of instructions to control the functional elements of the custodial token platform to perform the described functions. Additionally, or alternatively, the custodial token platform may perform aspects of the described functions using special-purpose hardware.

At 1205, the method may include receiving, at a custodial token platform on one or more servers and from a first client application on a first user device, a partially signed message that is signed by the first client application using a first key shard stored at the first user device, where the first key shard is associated with a first private key. The operations of 1205 may be performed in accordance with examples as disclosed herein. In some examples, aspects of the operations of 1205 may be performed by a client message interface 725 as described with reference to FIG. 7.

At 1210, the method may include signing, at the custodial token platform on the one or more servers, the partially signed message using a second key shard stored at the one or more servers to generate a fully signed message, where the second key shard is associated with the first private key. The operations of 1210 may be performed in accordance with examples as disclosed herein. In some examples, aspects of the operations of 1210 may be performed by a signing component 730 as described with reference to FIG. 7.

At 1215, the method may include broadcasting, to a blockchain network supported distributed data store and after signing the partially signed message, the fully signed message. The operations of 1215 may be performed in accordance with examples as disclosed herein. In some examples, aspects of the operations of 1215 may be performed by a message broadcast interface 735 as described with reference to FIG. 7.

At 1220, the method may include receiving, at the custodial token platform on the one or more servers and from the first client application on the first user device, an encrypted payload that is encrypted using a public key associated with a second client application on a second user device, the encrypted payload including the first key shard. The operations of 1220 may be performed in accordance with examples as disclosed herein. In some examples, aspects of the operations of 1220 may be performed by a payload reception interface 740 as described with reference to FIG. 7.

At 1225, the method may include transmitting, to the second client application on the second user device, the encrypted payload for decryption by the second client application on the second user device using a second private key associated with the public key. The operations of 1225 may be performed in accordance with examples as disclosed herein. In some examples, aspects of the operations of 1225 may be performed by a payload transmission interface 745 as described with reference to FIG. 7.

FIG. 13 illustrates a flowchart showing a method 1300 that supports a multi-party computation self-custody wallet in accordance with aspects of the present disclosure. The operations of the method 1300 may be implemented by a custodial token platform or its components as described herein. For example, the operations of the method 1300 may be performed by a custodial token platform as described with reference to FIGS. 1 through 8. In some examples, a custodial token platform may execute a set of instructions to control the functional elements of the custodial token platform to perform the described functions. Additionally, or alternatively, the custodial token platform may perform aspects of the described functions using special-purpose hardware.

At 1305, the method may include receiving, at a custodial token platform on one or more servers and from a first client application on a first user device, a partially signed message that is signed by the first client application using a first key shard stored at the first user device, where the first key shard is associated with a first private key. The operations of 1305 may be performed in accordance with examples as disclosed herein. In some examples, aspects of the operations of 1305 may be performed by a client message interface 725 as described with reference to FIG. 7.

At 1310, the method may include signing, at the custodial token platform on the one or more servers, the partially signed message using a second key shard stored at the one or more servers to generate a fully signed message, where the second key shard is associated with the first private key. The operations of 1310 may be performed in accordance with examples as disclosed herein. In some examples, aspects of the operations of 1310 may be performed by a signing component 730 as described with reference to FIG. 7.

At 1315, the method may include broadcasting, to a blockchain network supported distributed data store and after signing the partially signed message, the fully signed message. The operations of 1315 may be performed in accordance with examples as disclosed herein. In some examples, aspects of the operations of 1315 may be performed by a message broadcast interface 735 as described with reference to FIG. 7.

At 1320, the method may include receiving, at the custodial token platform on the one or more servers and from the first client application on the first user device, an encrypted payload that is encrypted using a public key associated with a second client application on a second user device, the encrypted payload including the first key shard. The operations of 1320 may be performed in accordance with examples as disclosed herein. In some examples, aspects of the operations of 1320 may be performed by a payload reception interface 740 as described with reference to FIG. 7.

At 1325, the method may include transmitting, to the second client application on the second user device, the encrypted payload for decryption by the second client application on the second user device using a second private key associated with the public key. The operations of 1325 may be performed in accordance with examples as disclosed herein. In some examples, aspects of the operations of 1325 may be performed by a payload transmission interface 745 as described with reference to FIG. 7.

At 1330, the method may include receiving, at the custodial token platform on the one or more servers and from the second client application on the second user device, a second partially signed message that is signed by the first key shard stored on the second user device. The operations of 1330 may be performed in accordance with examples as disclosed herein. In some examples, aspects of the operations of 1330 may be performed by a client message interface 725 as described with reference to FIG. 7.

At 1335, the method may include signing, at the custodial token platform on the one or more servers, the second partially signed message using the second key shard stored at the one or more servers to generate a second fully signed message. The operations of 1335 may be performed in accordance with examples as disclosed herein. In some examples, aspects of the operations of 1335 may be performed by a signing component 730 as described with reference to FIG. 7.

At 1340, the method may include broadcasting, to the blockchain network supported distributed data store, the second fully signed message. The operations of 1340 may be performed in accordance with examples as disclosed herein. In some examples, aspects of the operations of 1340 may be performed by a message broadcast interface 735 as described with reference to FIG. 7.

Figure 14:
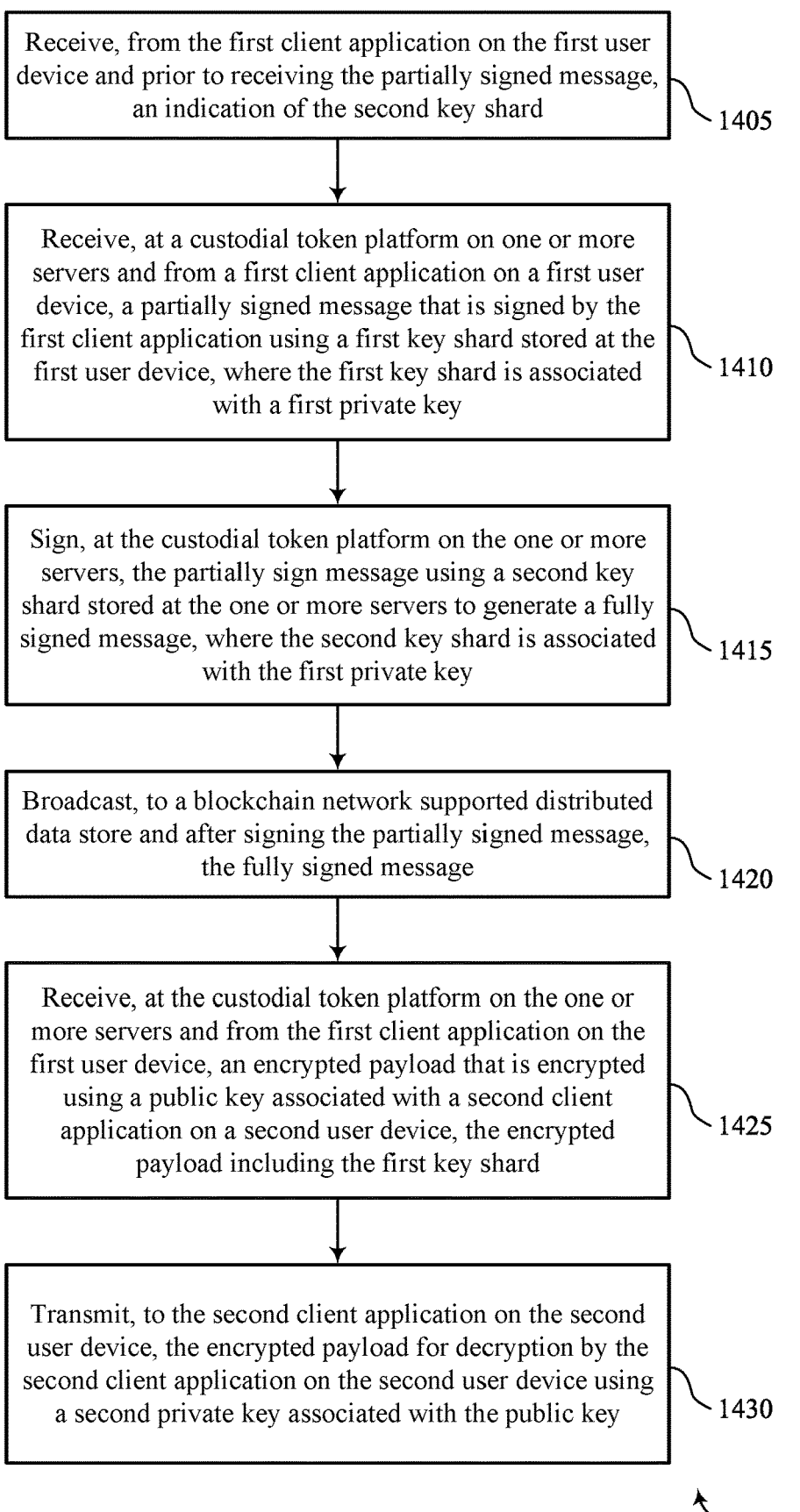

FIG. 14 illustrates a flowchart showing a method 1400 that supports a multi-party computation self-custody wallet in accordance with aspects of the present disclosure. The operations of the method 1400 may be implemented by a custodial token platform or its components as described herein. For example, the operations of the method 1400 may be performed by a custodial token platform as described with reference to FIGS. 1 through 8. In some examples, a custodial token platform may execute a set of instructions to control the functional elements of the custodial token platform to perform the described functions. Additionally, or alternatively, the custodial token platform may perform aspects of the described functions using special-purpose hardware.

At 1405, the method may include receiving, from the first client application on the first user device and prior to receiving the partially signed message, an indication of the second key shard. The operations of 1405 may be performed in accordance with examples as disclosed herein. In some examples, aspects of the operations of 1405 may be performed by a key shard interface 760 as described with reference to FIG. 7.

At 1410, the method may include receiving, at a custodial token platform on one or more servers and from a first client application on a first user device, a partially signed message that is signed by the first client application using a first key shard stored at the first user device, where the first key shard is associated with a first private key. The operations of 1410 may be performed in accordance with examples as disclosed herein. In some examples, aspects of the operations of 1410 may be performed by a client message interface 725 as described with reference to FIG. 7.

At 1415, the method may include signing, at the custodial token platform on the one or more servers, the partially signed message using a second key shard stored at the one or more servers to generate a fully signed message, where the second key shard is associated with the first private key. The operations of 1415 may be performed in accordance with examples as disclosed herein. In some examples, aspects of the operations of 1415 may be performed by a signing component 730 as described with reference to FIG. 7.

At 1420, the method may include broadcasting, to a blockchain network supported distributed data store and after signing the partially signed message, the fully signed message. The operations of 1420 may be performed in accordance with examples as disclosed herein. In some examples, aspects of the operations of 1420 may be performed by a message broadcast interface 735 as described with reference to FIG. 7.

At 1425, the method may include receiving, at the custodial token platform on the one or more servers and from the first client application on the first user device, an encrypted payload that is encrypted using a public key associated with a second client application on a second user device, the encrypted payload including the first key shard. The operations of 1425 may be performed in accordance with examples as disclosed herein. In some examples, aspects of the operations of 1425 may be performed by a payload reception interface 740 as described with reference to FIG. 7.

At 1430, the method may include transmitting, to the second client application on the second user device, the encrypted payload for decryption by the second client application on the second user device using a second private key associated with the public key. The operations of 1430 may be performed in accordance with examples as disclosed herein. In some examples, aspects of the operations of 1430 may be performed by a pay load transmission interface 745 as described with reference to FIG. 7.

Figure 15:
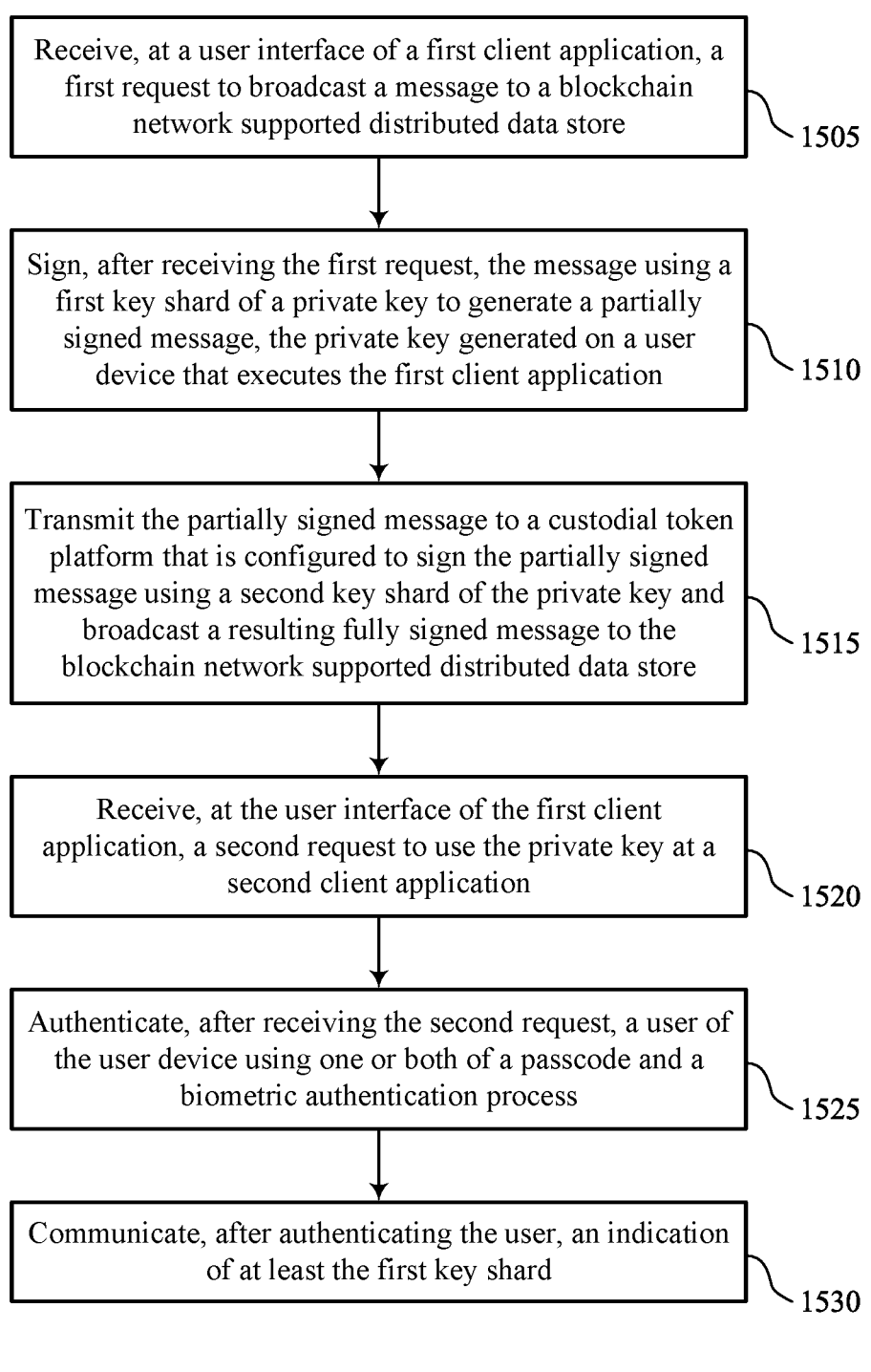

FIG. 15 illustrates a flowchart showing a method 1500 that supports a multi-party computation self-custody wallet in accordance with aspects of the present disclosure. The operations of the method 1500 may be implemented by a user device or its components as described herein. For example, the operations of the method 1500 may be performed by a user device as described with reference to FIGS. 1 through 5 and 9 through 11. In some examples, a user device may execute a set of instructions to control the functional elements of the user device to perform the described functions. Additionally, or alternatively, the user device may perform aspects of the described functions using special-purpose hardware.

At 1505, the method may include receiving, at a user interface of a first client application, a first request to broadcast a message to a blockchain network supported distributed data store. The operations of 1505 may be performed in accordance with examples as disclosed herein. In some examples, aspects of the operations of 1505 may be performed by a message request interface 1025 as described with reference to FIG. 10.

At 1510, the method may include signing, after receiving the first request, the message using a first key shard of a private key to generate a partially signed message, the private key generated on a user device that executes the first client application. The operations of 1510 may be performed in accordance with examples as disclosed herein. In some examples, aspects of the operations of 1510 may be performed by a message signing component 1030 as described with reference to FIG. 10.

At 1515, the method may include transmitting the partially signed message to a custodial token platform that is configured to sign the partially signed message using a second key shard of the private key and broadcast a resulting fully signed message to the blockchain network supported distributed data store. The operations of 1515 may be performed in accordance with examples as disclosed herein. In some examples, aspects of the operations of 1515 may be performed by a message communication interface 1035 as described with reference to FIG. 10.

At 1520, the method may include receiving, at the user interface of the first client application, a second request to use the private key at a second client application. The operations of 1520 may be performed in accordance with examples as disclosed herein. In some examples, aspects of the operations of 1520 may be performed by a key management component 1040 as described with reference to FIG. 10.

At 1525, the method may include authenticating, after receiving the second request, a user of the user device using one or both of a passcode and a biometric authentication process. The operations of 1525 may be performed in accordance with examples as disclosed herein. In some examples, aspects of the operations of 1525 may be performed by a user authentication component 1045 as described with reference to FIG. 10.

At 1530, the method may include communicating, after authenticating the user, an indication of at least the first key shard. The operations of 1530 may be performed in accordance with examples as disclosed herein. In some examples, aspects of the operations of 1530 may be performed by a key shard communication component 1050 as described with reference to FIG. 10.

FIG. 16 illustrates a flowchart showing a method 1600 that supports a multi-party computation self-custody wallet in accordance with aspects of the present disclosure. The operations of the method 1600 may be implemented by a user device or its components as described herein. For example, the operations of the method 1600 may be performed by a user device as described with reference to FIGS. 1 through 5 and 9 through 11. In some examples, a user device may execute a set of instructions to control the functional elements of the user device to perform the described functions. Additionally, or alternatively, the user device may perform aspects of the described functions using special-purpose hardware.

At 1605, the method may include receiving, at a user interface of a first client application, a first request to broadcast a message to a blockchain network supported distributed data store. The operations of 1605 may be performed in accordance with examples as disclosed herein. In some examples, aspects of the operations of 1605 may be performed by a message request interface 1025 as described with reference to FIG. 10.

At 1610, the method may include signing, after receiving the first request, the message using a first key shard of a private key to generate a partially signed message, the private key generated on a user device that executes the first client application. The operations of 1610 may be performed in accordance with examples as disclosed herein. In some examples, aspects of the operations of 1610 may be performed by a message signing component 1030 as described with reference to FIG. 10.

At 1615, the method may include transmitting the partially signed message to a custodial token platform that is configured to sign the partially signed message using a second key shard of the private key and broadcast a resulting fully signed message to the blockchain network supported distributed data store. The operations of 1615 may be performed in accordance with examples as disclosed herein. In some examples, aspects of the operations of 1615 may be performed by a message communication interface 1035 as described with reference to FIG. 10.

At 1620, the method may include receiving, at the user interface of the first client application, a second request to use the private key at a second client application. The operations of 1620 may be performed in accordance with examples as disclosed herein. In some examples, aspects of the operations of 1620 may be performed by a key management component 1040 as described with reference to FIG. 10.

At 1625, the method may include authenticating, after receiving the second request, a user of the user device using one or both of a passcode and a biometric authentication process. The operations of 1625 may be performed in accordance with examples as disclosed herein. In some examples, aspects of the operations of 1625 may be performed by a user authentication component 1045 as described with reference to FIG. 10.

At 1630, the method may include decrypting, after authenticating the user, a copy of the second key shard, the first key shard and the second key shard used to generate the private key, and where communicating the indication includes transmitting an indication of the private key. The operations of 1630 may be performed in accordance with examples as disclosed herein. In some examples, aspects of the operations of 1630 may be performed by a key management component 1040 as described with reference to FIG. 10.

At 1635, the method may include displaying, at the user device, the indication of the private key. The operations of 1635 may be performed in accordance with examples as disclosed herein. In some examples, aspects of the operations of 1635 may be performed by a UI component 1060 as described with reference to FIG. 10.

At 1640, the method may include communicating, after authenticating the user, an indication of at least the first key shard. The operations of 1640 may be performed in accordance with examples as disclosed herein. In some examples, aspects of the operations of 1640 may be performed by a key shard communication component 1050 as described with reference to FIG. 10.

Figure 17:
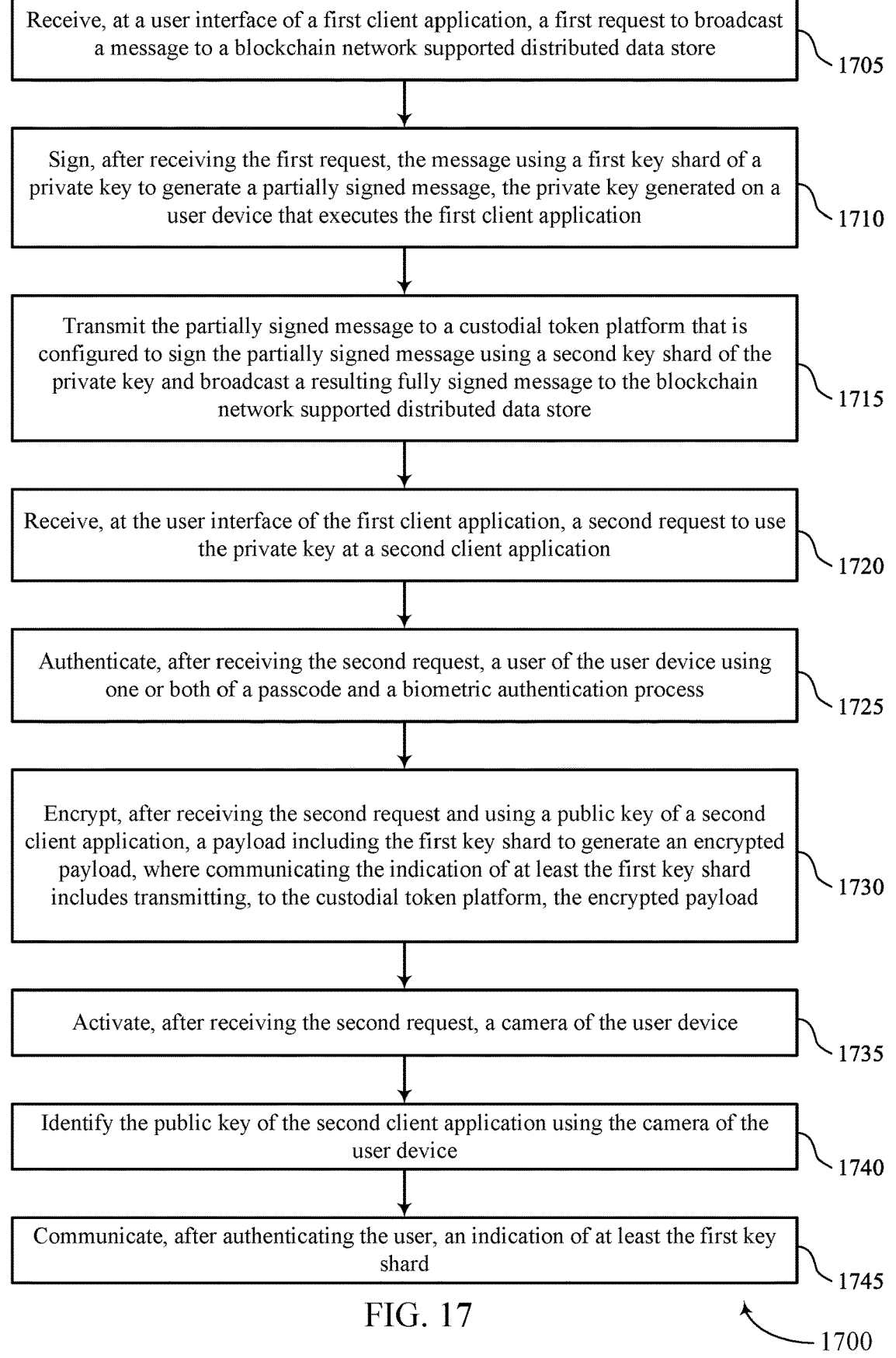

FIG. 17 illustrates a flowchart showing a method 1700 that supports a multi-party computation self-custody wallet in accordance with aspects of the present disclosure. The operations of the method 1700 may be implemented by a user device or its components as described herein. For example, the operations of the method 1700 may be performed by a user device as described with reference to FIGS. 1 through 5 and 9 through 11. In some examples, a user device may execute a set of instructions to control the functional elements of the user device to perform the described functions. Additionally, or alternatively, the user device may perform aspects of the described functions using special-purpose hardware.

At 1705, the method may include receiving, at a user interface of a first client application, a first request to broadcast a message to a blockchain network supported distributed data store. The operations of 1705 may be performed in accordance with examples as disclosed herein. In some examples, aspects of the operations of 1705 may be performed by a message request interface 1025 as described with reference to FIG. 10.

At 1710, the method may include signing, after receiving the first request, the message using a first key shard of a private key to generate a partially signed message, the private key generated on a user device that executes the first client application. The operations of 1710 may be performed in accordance with examples as disclosed herein. In some examples, aspects of the operations of 1710 may be performed by a message signing component 1030 as described with reference to FIG. 10.

At 1715, the method may include transmitting the partially signed message to a custodial token platform that is configured to sign the partially signed message using a second key shard of the private key and broadcast a resulting fully signed message to the blockchain network supported distributed data store. The operations of 1715 may be performed in accordance with examples as disclosed herein. In some examples, aspects of the operations of 1715 may be performed by a message communication interface 1035 as described with reference to FIG. 10.

At 1720, the method may include receiving, at the user interface of the first client application, a second request to use the private key at a second client application. The operations of 1720 may be performed in accordance with examples as disclosed herein. In some examples, aspects of the operations of 1720 may be performed by a key management component 1040 as described with reference to FIG. 10.

At 1725, the method may include authenticating, after receiving the second request, a user of the user device using one or both of a passcode and a biometric authentication process. The operations of 1725 may be performed in accordance with examples as disclosed herein. In some examples, aspects of the operations of 1725 may be performed by a user authentication component 1045 as described with reference to FIG. 10.

At 1730, the method may include encrypting, after receiving the second request and using a public key of a second client application, a payload including the first key shard to generate an encrypted payload, where communicating the indication of at least the first key shard includes transmitting, to the custodial token platform, the encrypted payload. The operations of 1730 may be performed in accordance with examples as disclosed herein. In some examples, aspects of the operations of 1730 may be performed by a payload encryption component 1055 as described with reference to FIG. 10.

At 1735, the method may include activating, after receiving the second request, a camera of the user device. The operations of 1735 may be performed in accordance with examples as disclosed herein. In some examples, aspects of the operations of 1735 may be performed by a camera component 1065 as described with reference to FIG. 10.

At 1740, the method may include identifying the public key of the second client application using the camera of the user device. The operations of 1740 may be performed in accordance with examples as disclosed herein. In some examples, aspects of the operations of 1740 may be performed by a key identification component 1070 as described with reference to FIG. 10.

At 1745, the method may include communicating, after authenticating the user, an indication of at least the first key shard. The operations of 1745 may be performed in accordance with examples as disclosed herein. In some examples, aspects of the operations of 1745 may be performed by a key shard communication component 1050 as described with reference to FIG. 10.

A method for data processing is described. The method may include receiving, at a custodial token platform on one or more servers and from a first client application on a first user device, a partially signed message that is signed by the first client application using a first key shard stored at the first user device, where the first key shard is associated with a first private key, signing, at the custodial token platform on the one or more servers, the partially signed message using a second key shard stored at the one or more servers to generate a fully signed message, where the second key shard is associated with the first private key, broadcasting, to a blockchain network supported distributed data store and after signing the partially signed message, the fully signed message, receiving, at the custodial token platform on the one or more servers and from the first client application on the first user device, an encrypted payload that is encrypted using a public key associated with a second client application on a second user device, the encrypted payload including the first key shard, and transmitting, to the second client application on the second user device, the encrypted payload for decryption by the second client application on the second user device using a second private key associated with the public key.

An apparatus for data processing is described. The apparatus may include a processor, memory coupled with the processor, and instructions stored in the memory. The instructions may be executable by the processor to cause the apparatus to receive, at a custodial token platform on one or more servers and from a first client application on a first user device, a partially signed message that is signed by the first client application using a first key shard stored at the first user device, where the first key shard is associated with a first private key, signing, at the custodial token platform on the one or more servers, the partially sign message using a second key shard stored at the one or more servers to generate a fully signed message, where the second key shard is associated with the first private key, broadcast, to a blockchain network supported distributed data store and after signing the partially signed message, the fully signed message, receive, at the custodial token platform on the one or more servers and from the first client application on the first user device, an encrypted payload that is encrypted using a public key associated with a second client application on a second user device, the encrypted payload including the first key shard, and transmit, to the second client application on the second user device, the encrypted payload for decryption by the second client application on the second user device using a second private key associated with the public key.

Another apparatus for data processing is described. The apparatus may include means for receiving, at a custodial token platform on one or more servers and from a first client application on a first user device, a partially signed message that is signed by the first client application using a first key shard stored at the first user device, where the first key shard is associated with a first private key, means for signing, at the custodial token platform on the one or more servers, the partially signed message using a second key shard stored at the one or more servers to generate a fully signed message, where the second key shard is associated with the first private key, means for broadcasting, to a blockchain network supported distributed data store and after signing the partially signed message, the fully signed message, means for receiving, at the custodial token platform on the one or more servers and from the first client application on the first user device, an encrypted payload that is encrypted using a public key associated with a second client application on a second user device, the encrypted payload including the first key shard, and means for transmitting, to the second client application on the second user device, the encrypted payload for decryption by the second client application on the second user device using a second private key associated with the public key.

A non-transitory computer-readable medium storing code for data processing is described. The code may include instructions executable by a processor to receive, at a custodial token platform on one or more servers and from a first client application on a first user device, a partially signed message that is signed by the first client application using a first key shard stored at the first user device, where the first key shard is associated with a first private key, signing, at the custodial token platform on the one or more servers, the partially sign message using a second key shard stored at the one or more servers to generate a fully signed message, where the second key shard is associated with the first private key, broadcast, to a blockchain network supported distributed data store and after signing the partially signed message, the fully signed message, receive, at the custodial token platform on the one or more servers and from the first client application on the first user device, an encrypted payload that is encrypted using a public key associated with a second client application on a second user device, the encrypted payload including the first key shard, and transmit, to the second client application on the second user device, the encrypted payload for decryption by the second client application on the second user device using a second private key associated with the public key.

Some examples of the method, apparatuses, and non-transitory computer-readable medium described herein may further include operations, features, means, or instructions for receiving, at the custodial token platform on the one or more servers and from the second client application on the second user device, a second partially signed message that may be signed by the first key shard stored on the second user device, signing, at the custodial token platform on the one or more servers, the second partially signed message using the second key shard stored at the one or more servers to generate a second fully signed message, and broadcasting, to the blockchain network supported distributed data store, the second fully signed message.

Some examples of the method, apparatuses, and non-transitory computer-readable medium described herein may further include operations, features, means, or instructions for transmitting, with the encrypted payload and to the second client application on the second user device, the second key shard of the first private key.

Some examples of the method, apparatuses, and non-transitory computer-readable medium described herein may further include operations, features, means, or instructions for deleting, from the custodial token platform, the encrypted payload after transmitting the encrypted payload to the second client application.

In some examples of the method, apparatuses, and non-transitory computer-readable medium described herein, broadcasting the fully signed message may include operations, features, means, or instructions for broadcasting the fully signed message that may be configured to cause transfer of a crypto token from a wallet address associated with the first client application to another wallet address via the blockchain network supported distributed data store.

Some examples of the method, apparatuses, and non-transitory computer-readable medium described herein may further include operations, features, means, or instructions for receiving, from the first client application on the first user device and prior to receiving the partially signed message, an indication of the second key shard.

A method for data processing is described. The method may include receiving, at a user interface of a first client application, a first request to broadcast a message to a blockchain network supported distributed data store, signing, after receiving the first request, the message using a first key shard of a private key to generate a partially signed message, the private key generated on a user device that executes the first client application, transmitting the partially signed message to a custodial token platform that is configured to sign the partially signed message using a second key shard of the private key and broadcast a resulting fully signed message to the blockchain network supported distributed data store, receiving, at the user interface of the first client application, a second request to use the private key at a second client application, authenticating, after receiving the second request, a user of the user device using one or both of a passcode and a biometric authentication process, and communicating, after authenticating the user, an indication of at least the first key shard.

An apparatus for data processing is described. The apparatus may include a processor, memory coupled with the processor, and instructions stored in the memory. The instructions may be executable by the processor to cause the apparatus to receive, at a user interface of a first client application, a first request to broadcast a message to a blockchain network supported distributed data store, signing, after receiving the first request, the message using a first key shard of a private key to generate a partially signed message, the private key generated on a user device that executes the first client application, transmit the partially signed message to a custodial token platform that is configured to sign the partially signed message using a second key shard of the private key and broadcast a resulting fully signed message to the blockchain network supported distributed data store, receive, at the user interface of the first client application, a second request to use the private key at a second client application, authenticate, after receiving the second request, a user of the user device using one or both of a passcode and a biometric authentication process, and communicating, after authenticating the user, an indication of at least the first key shard.

Another apparatus for data processing is described. The apparatus may include means for receiving, at a user interface of a first client application, a first request to broadcast a message to a blockchain network supported distributed data store, means for signing, after receiving the first request, the message using a first key shard of a private key to generate a partially signed message, the private key generated on a user device that executes the first client application, means for transmitting the partially signed message to a custodial token platform that is configured to sign the partially signed message using a second key shard of the private key and broadcast a resulting fully signed message to the blockchain network supported distributed data store, means for receiving, at the user interface of the first client application, a second request to use the private key at a second client application, means for authenticating, after receiving the second request, a user of the user device using one or both of a passcode and a biometric authentication process, and means for communicating, after authenticating the user, an indication of at least the first key shard.

A non-transitory computer-readable medium storing code for data processing is described. The code may include instructions executable by a processor to receive, at a user interface of a first client application, a first request to broadcast a message to a blockchain network supported distributed data store, signing, after receive the first request, the message using a first key shard of a private key to generate a partially signed message, the private key generated on a user device that executes the first client application, transmit the partially signed message to a custodial token platform that is configured to sign the partially signed message using a second key shard of the private key and broadcast a resulting fully signed message to the blockchain network supported distributed data store, receive, at the user interface of the first client application, a second request to use the private key at a second client application, authenticate, after receiving the second request, a user of the user device using one or both of a passcode and a biometric authentication process, and communicating, after authenticating the user, an indication of at least the first key shard.

In some examples of the method, apparatuses, and non-transitory computer-readable medium described herein, decrypting, after authenticating the user, a copy of the second key shard, the first key shard and the second key shard used to generate the private key, and where communicating the indication includes transmitting an indication of the private key.

In some examples of the method, apparatuses, and non-transitory computer-readable medium described herein, transmitting the indication of the private key may include operations, features, means, or instructions for displaying, at the user device, the indication of the private key.

In some examples of the method, apparatuses, and non-transitory computer-readable medium described herein, the second request includes a request to export the private key via the first client application.

In some examples of the method, apparatuses, and non-transitory computer-readable medium described herein, encrypting, after receiving the second request and using a public key of a second client application, a payload including the first key shard to generate an encrypted payload, where communicating the indication of at least the first key shard includes transmitting, to the custodial token platform, the encrypted payload.

Some examples of the method, apparatuses, and non-transitory computer-readable medium described herein may further include operations, features, means, or instructions for activating, after receiving the second request, a camera of the user device and identifying the public key of the second client application using the camera of the user device.

In some examples of the method, apparatuses, and non-transitory computer-readable medium described herein, identifying the public key may include operations, features, means, or instructions for scanning, using the camera, a quick response (QR) code associated with the public key.

In some examples of the method, apparatuses, and non-transitory computer-readable medium described herein, the second request includes a request to clone the first key shard to the second client application.

Some examples of the method, apparatuses, and non-transitory computer-readable medium described herein may further include operations, features, means, or instructions for generating, at the user device, the private key, storing a backup of the first key shard and the second key shard in a secure enclave of the user device, encrypting the first key shard using an encryption key that may be stored in the secure enclave of the user device, and transmitting, to the custodial token platform, an indication of the second key shard.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data processing, comprising:

receiving, at a user interface of a first client application, a first request to broadcast a blockchain message to a blockchain network supported distributed data store;

signing, after receiving the first request, the blockchain message using a first key shard of a private key associated with a first user of a first blockchain address to generate a partially signed blockchain message, the private key generated on a user device that executes the first client application, wherein the partially signed blockchain message comprises an indication of a second blockchain address that is to receive a transfer of one or more tokens from the first blockchain address;

transmitting the partially signed blockchain message to a custodial token platform that signs the partially signed blockchain message using a second key shard of the private key associated with the first user of the first blockchain address and broadcasts a resulting fully signed blockchain message to the blockchain network supported distributed data store to transfer the one or more tokens to the second blockchain address, wherein the first key shard and the second key shard of the private key are associated with the first blockchain address;

receiving, at the user interface of the first client application, a second request to clone the private key to a second device;

authenticating, after receiving the second request, a user of the user device using one or both of a passcode and a biometric authentication process;

encrypting, after receiving the second request and using a public key of a second client application, a payload comprising the first key shard to generate an encrypted payload; and transmitting the encrypted payload to the custodial token platform in accordance with the second request.

2. The method of claim 1, further comprising:

decrypting, after authenticating the user, a copy of the second key shard, the first key shard and the second key shard used to generate the private key; and transmitting information associated with the private key.

3. The method of claim 2, wherein transmitting the information associated with the private key comprises:

displaying, at the user device, the information associated with the private key.

4. The method of claim 1, further comprising:

activating, after receiving the second request, a camera of the user device; and identifying the public key of the second client application using the camera of the user device.

5. The method of claim 4, wherein identifying the public key comprises:

scanning, using the camera, a quick response (QR) code associated with the public key.

6. The method of claim 1, wherein the second request comprises a request to clone the first key shard to the second client application.

7. The method of claim 1, further comprising:

generating, at the user device, the private key;

storing a backup of the first key shard and the second key shard in a secure enclave of the user device;

encrypting the first key shard using an encryption key that is stored in the secure enclave of the user device; and transmitting, to the custodial token platform, an indication of the second key shard.

8. An apparatus for data processing, comprising:

a processor;

memory coupled with the processor; and instructions stored in the memory and executable by the processor to cause the apparatus to:

receive, at a user interface of a first client application, a first request to broadcast a blockchain message to a blockchain network supported distributed data store;

sign, after receiving the first request, the blockchain message using a first key shard of a private key associated with a first user of a first blockchain address to generate a partially signed blockchain message, the private key generated on a user device that executes the first client application, wherein the partially signed blockchain message comprises an indication of a second blockchain address that is to receive a transfer of one or more tokens from the first blockchain address;

transmit the partially signed blockchain message to a custodial token platform that signs the partially signed blockchain message using a second key shard of the private key associated with the first user of the first blockchain address and broadcasts a resulting fully signed blockchain message to the blockchain network supported distributed data store to transfer the one or more tokens to the second blockchain address, wherein the first key shard and the second key shard of the private key are associated with the first blockchain address;

receive, at the user interface of the first client application, a second request to clone the private key to a second device;

authenticate, after receiving the second request, a user of the user device using one or both of a passcode and a biometric authentication process;

encrypt, after receiving the second request and using a public key of a second client application, a payload comprising the first key shard to generate an encrypted payload; and transmit the encrypted payload to the custodial token platform in accordance with the second request.

9. The apparatus of claim 8, wherein the instructions are further executable by the processor to cause the apparatus to:

decrypt, after authenticating the user, a copy of the second key shard, the first key shard and the second key shard used to generate the private key; and transmit information associated with the private key.

10. The apparatus of claim 9, wherein the instructions to transmit the information associated with the private key are executable by the processor to cause the apparatus to:

display, at the user device, the information associated with the private key.

11. The apparatus of claim 8, wherein the instructions are further executable by the processor to cause the apparatus to:

activate, after receiving the second request, a camera of the user device; and identify the public key of the second client application using the camera of the user device.

12. A non-transitory computer-readable medium storing code for data processing, the code comprising instructions executable by a processor to:

receive, at a user interface of a first client application, a first request to broadcast a blockchain message to a blockchain network supported distributed data store;

sign, after receiving the first request, the blockchain message using a first key shard of a private key associated with a first user of a first blockchain address to generate a partially signed blockchain message, the private key generated on a user device that executes the first client application, wherein the partially signed blockchain message comprises an indication of a second blockchain address that is to receive a transfer of one or more tokens from the first blockchain address;

transmit the partially signed blockchain message to a custodial token platform that signs the partially signed blockchain message using a second key shard of the private key associated with the first user of the first blockchain address and broadcasts a resulting fully signed blockchain message to the blockchain network supported distributed data store to transfer the one or more tokens to the second blockchain address, wherein the first key shard and the second key shard of the private key are associated with the first blockchain address;

receive, at the user interface of the first client application, a second request to clone the private key to a second device;

authenticate, after receiving the second request, a user of the user device using one or both of a passcode and a biometric authentication process;

encrypt, after receiving the second request and using a public key of a second client application, a payload comprising the first key shard to generate an encrypted payload; and transmit the encrypted payload to the custodial token platform in accordance with the second request.

13. The non-transitory computer-readable medium of claim 12, wherein the instructions are further executable by the processor to:

decrypt, after authenticating the user, a copy of the second key shard, the first key shard and the second key shard used to generate the private key; and transmit an information associated with the private key.

14. The non-transitory computer-readable medium of claim 13, wherein the instructions to transmit the information associated with the private key are executable by the processor to:

display, at the user device, the information associated with the private key.

\* \* \* \* \*